United States Patent
Yamada et al.

(10) Patent No.: US 11,879,650 B2
(45) Date of Patent: Jan. 23, 2024

(54) AIR CONDITIONING SYSTEM

(71) Applicant: DAIKIN INDUSTRIES, LTD., Osaka (JP)

(72) Inventors: Miki Yamada, Osaka (JP); Junichi Shimoda, Osaka (JP)

(73) Assignee: Daikin Industries, Ltd., Osaka (JP)

(*) Notice: Subject to any disclaimer, the term of this patent is extended or adjusted under 35 U.S.C. 154(b) by 415 days.

(21) Appl. No.: 17/265,694

(22) PCT Filed: Aug. 6, 2018

(86) PCT No.: PCT/JP2018/029416
§ 371 (c)(1),
(2) Date: Feb. 3, 2021

(87) PCT Pub. No.: WO2020/031233
PCT Pub. Date: Feb. 13, 2020

(65) Prior Publication Data
US 2021/0318012 A1    Oct. 14, 2021

(51) Int. Cl.
*F24F 11/36* (2018.01)
*F24F 11/77* (2018.01)

(52) U.S. Cl.
CPC .......... *F24F 11/36* (2018.01); *F24F 11/77* (2018.01); *F24F 2221/34* (2013.01)

(58) Field of Classification Search
CPC ...... F24F 11/30; F24F 11/36; F24F 2013/227; F24F 13/222
See application file for complete search history.

(56) References Cited

U.S. PATENT DOCUMENTS

2013/0098576 A1* 4/2013 Fujitaka ............... F24F 11/46
165/11.1
2014/0262134 A1* 9/2014 Arensmeier ......... F24F 11/36
165/11.2
(Continued)

FOREIGN PATENT DOCUMENTS

JP    64-54160 A    3/1989
JP    2013-88086 A    5/2013
(Continued)

OTHER PUBLICATIONS

International Preliminary Report on Patentability and English translation of the Written Opinion of the International Searching Authority for International Application No. PCT/JP2018/029416, dated Feb. 18, 2021.
(Continued)

*Primary Examiner* — Nelson J Nieves
*Assistant Examiner* — Meraj A Shaikh
(74) *Attorney, Agent, or Firm* — Birch, Stewart, Kolasch & Birch, LLP

(57) ABSTRACT

An air conditioning system has: an indoor fan that sends air into a room through an air-blowing flow path; a heat pump unit that air-conditions the room with a vapor compression refrigerant circuit; and a separate heat source unit that air-conditions the room with a furnace that heats air by burning fuel or an electric heater that heats air with heat generated by energization. As a refrigerant, a flammable refrigerant is sealed in the refrigerant circuit. A controller controls an operation of the indoor fan, the heat pump unit, and the separate heat source unit. When starting air conditioning in the room with the separate heat source unit, the controller brings a state where the indoor fan is in operation before causing an operation for burning fuel in the furnace.

7 Claims, 15 Drawing Sheets

(56) References Cited

U.S. PATENT DOCUMENTS

| | | | |
|---|---|---|---|
| 2016/0334115 A1* | 11/2016 | Kojima | F24D 5/12 |
| 2017/0292744 A1* | 10/2017 | Suzuki | F24F 11/74 |
| 2017/0343258 A1 | 11/2017 | Yamaguchi et al. | |
| 2019/0346165 A1* | 11/2019 | Obara | F24F 11/89 |
| 2020/0056820 A1* | 2/2020 | Suzuki | F25B 49/005 |
| 2021/0108819 A1* | 4/2021 | Chen | F24F 3/001 |

FOREIGN PATENT DOCUMENTS

| | | | | |
|---|---|---|---|---|
| JP | 2015-145758 A | 8/2015 | | |
| WO | WO-2009128151 A1 * | 10/2009 | | F24F 12/006 |
| WO | WO 2016/151642 A1 | 9/2016 | | |

OTHER PUBLICATIONS

International Search Report, issued in PCT/JP2018/029416, dated Oct. 23, 2018.

* cited by examiner

AIR CONDITIONING SYSTEM

TECHNICAL FIELD

An air conditioning system having a heat pump unit that air-conditions a room with a vapor compression refrigerant circuit, and a separate heat source unit that air-conditions the room with a heat source separate from the heat pump unit.

BACKGROUND ART

Conventionally, there is an air conditioning system having a heat pump unit that air-conditions a room with a vapor compression refrigerant circuit, and a separate heat source unit that air-conditions the room with a furnace (a heat source separate from the heat pump unit). As such an air conditioning system, as shown in Patent Literature 1 (JP S64-54160 A), there is an air conditioning system in which a refrigerant heat exchanger constituting a refrigerant circuit of a heat pump unit and a furnace constituting a separate heat source unit are arranged in an air-blowing flow path that sends air into a room.

SUMMARY OF THE INVENTION

In the conventional air conditioning system described above, when a flammable refrigerant is used as a refrigerant sealed in the refrigerant circuit, it is necessary to consider a possibility of leakage of the flammable refrigerant from the refrigerant circuit. For example, if air conditioning is performed by the separate heat source unit while the flammable refrigerant is leaking, the leaked flammable refrigerant may be ignited by the furnace.

An air conditioning system according to a first aspect includes: an indoor fan that sends air into a room through an air-blowing flow path; a heat pump unit that air-conditions the room with a refrigerant circuit of vapor compression; a separate heat source unit that air-conditions the room with a furnace that heats air by burning fuel or with an electric heater that heats air with heat generated by energization; and a control unit that controls an operation of the indoor fan, the heat pump unit, and the separate heat source unit. The refrigerant circuit has a refrigerant heat exchanger that heats air through heat exchange between the refrigerant and air. The refrigerant heat exchanger is arranged in the air-blowing flow path. The furnace or the electric heater is arranged in the air-blowing flow path. In the refrigerant circuit, a flammable refrigerant is sealed as the refrigerant. When starting air conditioning in the room with the separate heat source unit, the control unit brings a state where the indoor fan is in operation, before causing an operation for burning fuel in the furnace, or causing an operation for generating heat by energization in the electric heater.

If the air conditioning in the room is started by the separate heat source unit (the furnace or the electric heater) while the flammable refrigerant leaks and stays in the air-blowing flow path, the leaked flammable refrigerant may be ignited by the furnace or the electric heater.

Therefore, here, as described above, before an operation for burning fuel in the furnace or an operation for generating heat by energization in the electric heater is performed, a state where the indoor fan is in operation is made to eliminate a state where the leaked flammable refrigerant stays in the air-blowing flow path, even if a flammable refrigerant is leaking before starting of air conditioning in the room with the separate heat source unit (the furnace or the electric heater).

This can reduce, here, a possibility of a flammable refrigerant being ignited by the furnace or the electric heater, in starting air conditioning in the room with the separate heat source unit while the flammable refrigerant is leaking.

An air conditioning system according to a second aspect is the air conditioning system according to the first aspect, in which, when a flammable refrigerant is not leaking while the indoor fan is in operation in starting air conditioning in the room with the separate heat source unit, the control unit causes the operation for burning the fuel in the furnace or the operation for generating heat by energization in the electric heater.

An air conditioning system according to a third aspect is the air conditioning system according to the second aspect, in which, when the flammable refrigerant leaks while the indoor fan is in operation in starting air conditioning in the room with the separate heat source unit, the control unit does not cause the operation for burning fuel in the furnace or the operation for generating heat by energization in the electric heater.

Here, as described above, before the operation for burning fuel in the furnace or the operation for generating heat by energization in the electric heater is performed, leakage of a flammable refrigerant is also checked, in addition to the operation of the indoor fan.

This can allow, here, air conditioning in the room with the separate heat source unit when a flammable refrigerant is not leaking, and inhibit air conditioning in the room with the separate heat source unit if the flammable refrigerant is leaking.

An air conditioning system according to a fourth aspect is the air conditioning system according to the second or third aspect, in which a refrigerant sensor that detects the flammable refrigerant is provided in the air-blowing flow path.

This enables, here, detection as to whether or not a flammable refrigerant is leaking by using the refrigerant sensor.

An air conditioning system according to a fifth aspect is the air conditioning system according to the fourth aspect, in which the refrigerant sensor is provided on a downstream side of the refrigerant heat exchanger with respect to a flow direction of the air in the air-blowing flow path.

This enables, here, reliable detection of a leaked flammable refrigerant in a portion, in the air-blowing flow path, on the downstream side of the refrigerant heat exchanger through which air containing the leaked flammable refrigerant passes.

An air conditioning system according to a sixth aspect is the air conditioning system according to the fifth aspect, in which the refrigerant sensor is provided on an upstream side of the furnace or the electric heater with respect to the flow direction of the air in the air-blowing flow path.

This enables, here, reliable detection of a leaked flammable refrigerant in a portion, in the air-blowing flow path, on the downstream side of the refrigerant heat exchanger through which air containing the leaked flammable refrigerant passes, and in a portion on the upstream side of the furnace or the electric heater that may become an ignition source.

An air conditioning system according to a seventh aspect includes: an indoor fan that sends air into a room through an air-blowing flow path; a heat pump unit that air-conditions the room with a refrigerant circuit of vapor compression; a separate heat source unit that air-conditions the room with a furnace that heats the air by burning fuel; and a control unit that controls an operation of the indoor fan, the heat pump unit, and the separate heat source unit. The refrigerant circuit has a refrigerant heat exchanger that exchanges heat between a refrigerant and air. The refrigerant heat exchanger is arranged in the air-blowing flow path. The furnace is arranged in the air-blowing flow path. The furnace has an exhaust flow path that exhausts combustion gas generated by combustion of fuel. In the refrigerant circuit, a flammable refrigerant is sealed as the refrigerant. The air conditioning system further includes: a bypass flow path that connects the air-blowing flow path and the exhaust flow path; and a bypass opening and closing mechanism that opens and closes the bypass flow path. The control unit brings the bypass opening and closing mechanism into an open state when a flammable refrigerant leaks.

If a room is air-conditioned by the separate heat source unit (the furnace) while the flammable refrigerant is leaking, the leaked flammable refrigerant may be ignited by the furnace.

Therefore, here, as described above, by providing the bypass flow path and the bypass opening and closing mechanism, air in the air-blowing flow path is allowed to be exhausted by using the exhaust flow path of the furnace, and the leaked flammable refrigerant is exhausted from the air-blowing flow path by bringing the bypass opening and closing mechanism into an open state when the flammable refrigerant leaks.

This can reduce, here, a possibility of ignition due to the furnace, when the room is air-conditioned with the separate heat source unit while the flammable refrigerant is leaking.

An air conditioning system according to an eighth aspect is the air conditioning system according to the seventh aspect, in which the air-blowing flow path is provided with a main opening and closing mechanism that opens and closes the air-blowing flow path, at a position downstream of a portion where the bypass flow path is connected, with respect to a flow direction of the air in the air-blowing flow path. The control unit brings the main opening and closing mechanism into a closed state when bringing the bypass opening and closing mechanism into an open state.

This can cut off, here, communication between an outlet of the air-blowing flow path and inside of the room, and can reliably suppress the leaked flammable refrigerant from being sent into the room.

An air conditioning system according to a ninth aspect is the air conditioning system according to the seventh or eighth aspect, in which the bypass flow path is connected to a portion, in the air-blowing flow path, on a downstream side of the refrigerant heat exchanger with respect to a flow direction of the air in the air-blowing flow path.

This enables, here, reliable exhaust of the leaked flammable refrigerant in a portion, in the air-blowing flow path, on the downstream side of the refrigerant heat exchanger through which air containing the leaked flammable refrigerant passes.

An air conditioning system according to a tenth aspect is the air conditioning system according to any of the seventh to ninth aspects, in which a refrigerant sensor that detects the flammable refrigerant is provided in the air-blowing flow path.

This enables, here, detection as to whether or not a flammable refrigerant is leaking by using the refrigerant sensor.

An air conditioning system according to an eleventh aspect is the air conditioning system according to the tenth aspect, in which the refrigerant sensor is provided on a downstream side of the refrigerant heat exchanger with respect to the flow direction of the air in the air-blowing flow path.

This enables, here, reliable detection of a leaked flammable refrigerant in a portion, in the air-blowing flow path, on the downstream side of the refrigerant heat exchanger through which air containing the leaked flammable refrigerant passes.

An air conditioning system according to a twelfth aspect is the air conditioning system according to the eleventh aspect, in which the refrigerant sensor is provided on an upstream side of the furnace with respect to the flow direction of the air in the air-blowing flow path.

This enables, here, reliable detection of a leaked flammable refrigerant in a portion, in the air-blowing flow path, on the downstream side of the refrigerant heat exchanger through which air containing the leaked flammable refrigerant passes, and in a portion on the upstream side of the furnace that may become an ignition source.

DESCRIPTION OF EMBODIMENTS

Hereinafter, an air conditioning system will be described with reference to the drawings.

(1) First Embodiment
<Configuration>
—Overall—

Figure 1:
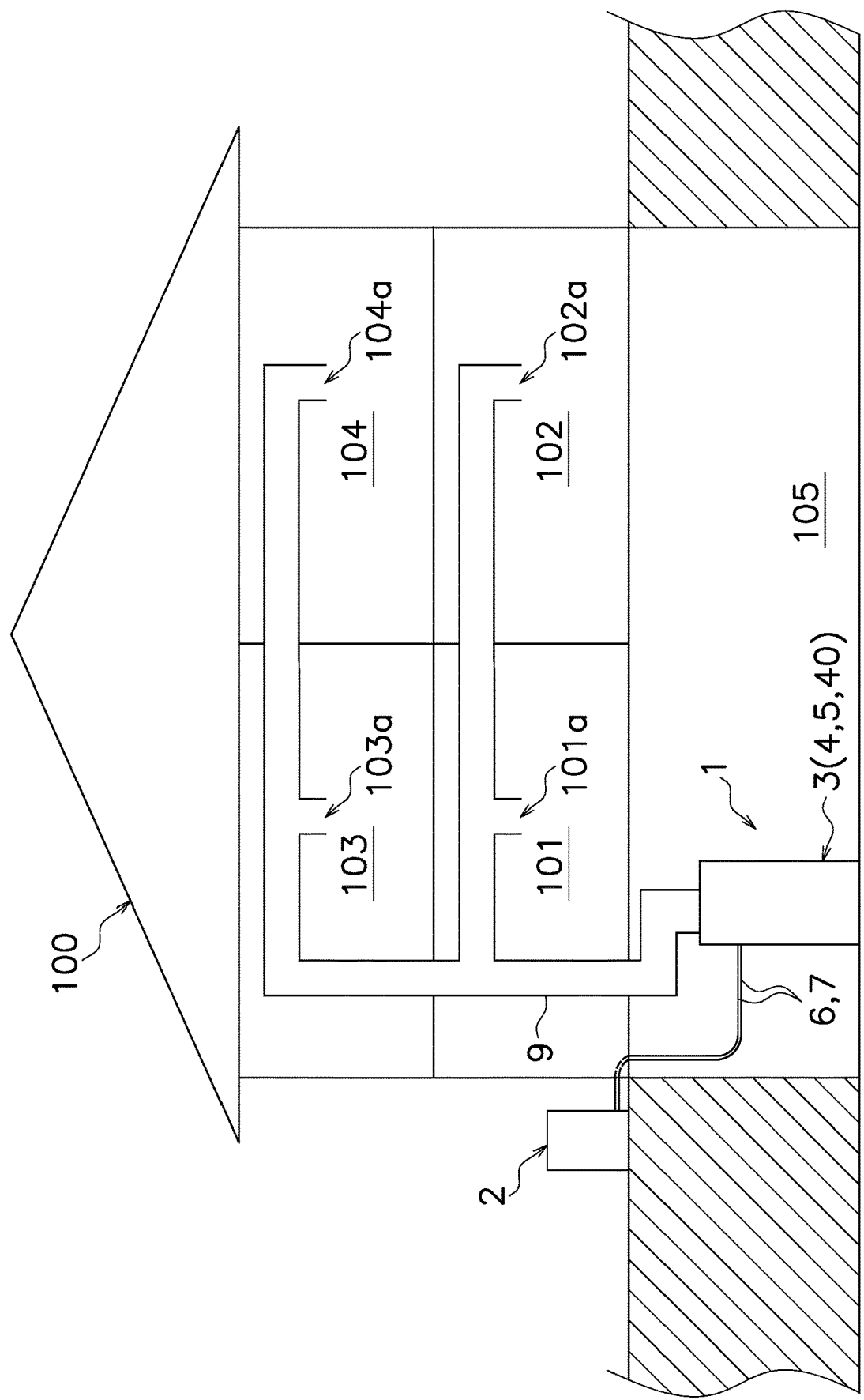
FIG. 1 is an exemplary view showing an arrangement of an air conditioning system according to a first and second embodiments and modified examples thereof.
Figure 2:
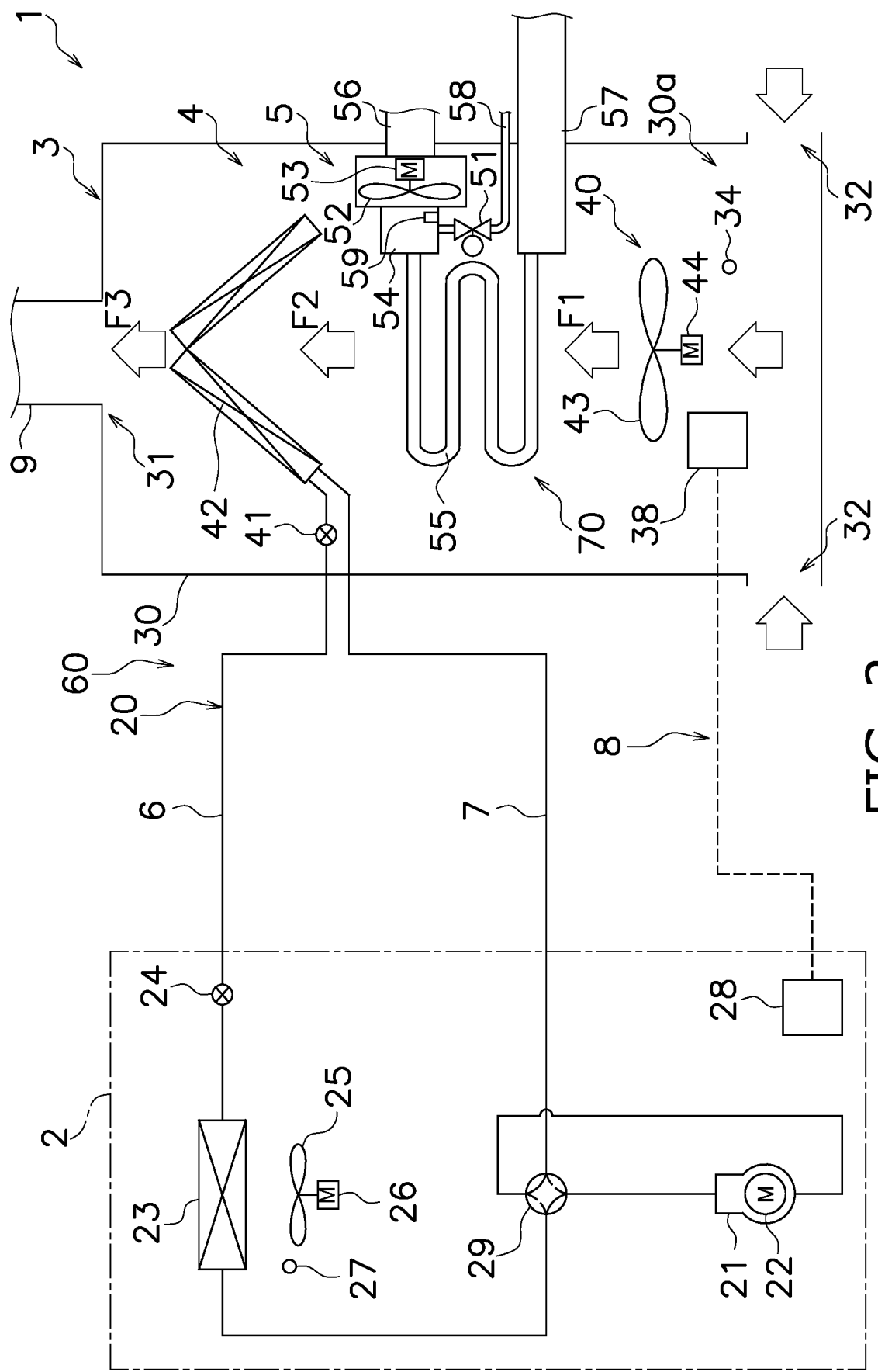
FIG. 2 is a schematic configuration diagram of the air conditioning system according to the first embodiment.

FIG. 1 is an exemplary view showing an arrangement of an air conditioning system 1 according to a first embodiment. FIG. 2 is a schematic configuration diagram of the air conditioning system 1 according to the first embodiment.

The air conditioning system 1 is a device used for air conditioning of houses or buildings. Here, the air conditioning system 1 is installed in a two-story house 100. In the house 100, rooms 101 and 102 are provided on the first floor, and rooms 103 and 104 are provided on the second floor. In addition, the house 100 is provided with a basement 105. Note that the house or the building in which the air conditioning system 1 is installed is not limited to a structure shown in FIG. 1, and may have another structure.

The air conditioning system 1 is a so-called duct air conditioning system. The air conditioning system 1 mainly includes: an outdoor unit 2; a utilization unit 3; refrigerant connection pipes 6 and 7 that connect the outdoor unit 2 and the utilization unit 3; and an air-blowing duct 9 that sends air that has been air-conditioned by the utilization unit 3, to rooms 101 to 104. The air-blowing duct 9 is branched into the rooms 101 to 104, and is connected to ventilation ports 101a to 104a of the respective rooms 101 to 104.

Here, the outdoor unit 2, an indoor unit 4 that is a part of the utilization unit 3, and the refrigerant connection pipes 6 and 7 constitute a heat pump unit 60 that air-conditions (heats) the room with a vapor compression refrigerant circuit 20. Further, a furnace unit 5 (a furnace), which is a part of the utilization unit 3, constitutes a separate heat source unit 70 that air-conditions (heats) the room with a heat source (here, heat generated by combustion of fuel) separate from the heat pump unit 60. As described above, here, the utilization unit 3 has both the indoor unit 4 constituting the heat pump unit 60 and the furnace unit 5 constituting the separate heat source unit 70. In addition, the utilization unit 3 has an indoor fan 40 that takes in air in the rooms 101 to 104 into a housing 30 of the utilization unit 3, and sends air that has been air-conditioned by the heat pump unit 60 (the indoor unit 4) and the separate heat source unit 70 (the furnace unit 5) into the rooms 101 to 104.

—Heat Pump Unit—

As described above, the heat pump unit 60 includes the outdoor unit 2, the indoor unit 4 that is a part of the utilization unit 3, and the refrigerant connection pipes 6 and 7. Here, the outdoor unit 2 and the indoor unit 4 are connected to each other via the refrigerant connection pipes 6 and 7. That is, the refrigerant circuit 20 of the heat pump unit 60 is configured by connecting the outdoor unit 2 and the indoor unit 4 via the refrigerant connection pipes 6 and 7. Here, the refrigerant connection pipes 6 and 7 are refrigerant pipes constructed on-site when the air conditioning system 1 is installed. Further, the refrigerant circuit 20 is filled with a refrigerant (hereinafter, referred to as a "flammable refrigerant") that may ignite under specific conditions, such as R32, as a refrigerant.

Here, the indoor unit 4 is provided in the housing 30 of the utilization unit 3 installed in a basement 105 of the house 100. The indoor unit 4 is connected to the outdoor unit 2 via the refrigerant connection pipes 6 and 7, and forms a part of the refrigerant circuit 20. Note that the utilization unit 3 may be provided in a place other than the basement 105.

The indoor unit 4 mainly includes: an indoor expansion valve 41; and an indoor heat exchanger 42 (a refrigerant heat exchanger) that heats air by heat radiation from the flammable refrigerant in the refrigeration cycle during a heat pump heating operation (described later). The indoor expansion valve 41 is a valve that decompresses the flammable refrigerant circulating in the refrigerant circuit 20, and adjusts a flow rate of the flammable refrigerant flowing through the indoor heat exchanger 42 as the refrigerant heat exchanger. Here, the indoor heat exchanger 42 is arranged on a most leeward side (a most downstream side with respect to a flow direction of air in the air-blowing flow path 30a), in the air-blowing flow path 30a from an air inflow port 32 to an air outflow port 31 formed in the housing 30 of the utilization unit 3.

The outdoor unit 2 is installed outside of the house 100. The outdoor unit 2 is connected to the indoor unit 4 via the refrigerant connection pipes 6 and 7, and forms a part of the refrigerant circuit 20.

The outdoor unit 2 mainly has a compressor 21, an outdoor heat exchanger 23, an outdoor expansion valve 24, and a four-way switching valve 29. The compressor 21 has a compression element (not illustrated) that compresses a flammable refrigerant, and a compressor motor 22 that rotationally drives the compression element. The outdoor heat exchanger 23 is a heat exchanger that evaporates the flammable refrigerant in the refrigeration cycle with outdoor air, during the heat pump heating operation. Near the outdoor heat exchanger 23, an outdoor fan 25 that sends outdoor air to the outdoor heat exchanger 23 is provided. The outdoor fan 25 is rotationally driven by an outdoor fan motor 26. The outdoor expansion valve 24 is a valve that decompresses the flammable refrigerant circulating in the refrigerant circuit 20 during the heat pump heating operation, before sending to the outdoor heat exchanger 23. The four-way switching valve 29 is a valve that switches a flow direction of the flammable refrigerant in the refrigerant circuit 20. During the heat pump heating operation, the four-way switching valve 29 is switched to a heating state (see a broken line of the four-way switching valve 29 in FIG. 2) for causing the indoor heat exchanger 42 to function as a radiator for the flammable refrigerant, and causing the outdoor heat exchanger 23 to function as an evaporator for the flammable refrigerant. In addition, the four-way switching valve 29 can also be switched to a cooling state (see a solid line of the four-way switching valve 29 in FIG. 2) for causing the indoor heat exchanger 42 to function as an evaporator for the flammable refrigerant, and causing the outdoor heat exchanger 23 to function as a radiator for the flammable refrigerant.

Further, the outdoor unit 2 is provided with an outdoor temperature sensor 27 that detects a temperature of outdoor air outside of the house 100 where the outdoor unit 2 is arranged, that is, an outside air temperature Ta. Further, the outdoor unit 2 has an outdoor-side control unit 28 that controls an operation of each part constituting the outdoor unit 2. The outdoor-side control unit 28 has a microcomputer, a memory, and the like provided for controlling the outdoor unit 2, and can exchange control signals and the like with the utilization unit 3.

—Separate Heat Source Unit—

As described above, the separate heat source unit 70 is configured by the furnace unit 5, which is a part of the utilization unit 3.

Here, the furnace unit 5 is provided in the housing 30 of the utilization unit 3 installed in the basement 105 of the house 100. Here, the furnace unit 5 is a gas combustion heating device.

The furnace unit 5 mainly includes a fuel gas valve 51, a furnace fan 52, a combustion unit 54, a furnace heat exchanger 55, an air supply pipe 56, an exhaust pipe 57, and an ignition device 59. The fuel gas valve 51 is configured by an electromagnetic valve or the like controllable to open and close, and is provided in a fuel gas supply pipe 58 extending from outside of the housing 30 to the combustion unit 54. Here, as the fuel gas, natural gas, petroleum gas, or the like is used. The furnace fan 52 is a fan that generates an air flow of taking in air into the combustion unit 54 through the air supply pipe 55, then sending the air to the furnace heat exchanger 55, and discharging from the exhaust pipe 57. The furnace fan 52 is rotationally driven by a furnace fan motor 53. The combustion unit 54 is a device that obtains high-temperature combustion gas by burning mixed gas of fuel gas and air with a gas burner or the like (not illustrated). The ignition device 59 is provided in the combustion unit 54. The ignition device 59 includes an igniter, and ignites the combustion unit 54. Here, the combustion unit 54 is separated from the air-blowing flow path 30*a* by a wall, but a flammable refrigerant leaking from the indoor heat exchanger 42 may come into contact with the ignition device 59 if a hole is made on the wall. In order to reduce a possibility of ignition of the flammable refrigerant even in such a case, energy of the ignition device 59 is preferably 120 V or less. The furnace heat exchanger 55 is a heat exchanger that heats air by heat radiation from the combustion gas (that is, the separate heat source) obtained by the combustion unit 54. Here, the furnace heat exchanger 55 is arranged on a windward side of the indoor heat exchanger 42 (on an upstream side of the indoor heat exchanger 42 with respect to a flow direction of the air in the air-blowing flow path 30*a*), in the air-blowing flow path 30*a* from the air inflow port 32 to the air outflow port 31 formed in the housing 30 of the utilization unit 3. Further, the utilization unit 3 is provided with an indoor temperature sensor 34 that detects an indoor temperature Tr, which is a temperature of air at the air inflow port 32 of the housing 30. Note that the indoor temperature sensor 34 may be provided in the rooms 101 to 104 instead of the utilization unit 3.

—Indoor Fan—

As described above, the indoor fan 40 is a fan that sends, into the rooms 101 to 104, air heated by the indoor heat exchanger 42 constituting the heat pump unit 60 and the furnace heat exchanger 55 constituting the separate heat source unit 70. Here, in the air-blowing flow path 30*a* from the air inflow port 32 to the air outflow port 31 formed in the housing 30 of the utilization unit 3, the indoor fan 40 is arranged on a windward side of both the indoor heat exchanger 42 and the furnace heat exchanger 55 (on an upstream side of the indoor heat exchanger 42 and the furnace heat exchanger 55 with respect to a flow direction of the air in the air-blowing flow path 30*a*). The indoor fan 40 includes an indoor fan 43 and an indoor fan motor 44 that rotationally drives the indoor fan 43. As the indoor fan 43, a sirocco fan or a turbo fan is used.

—Control Unit—

The utilization unit 3 has a utilization-side control unit 38 that controls an operation of each unit (the indoor unit 4, the furnace unit 5, and the indoor fan 40) that constitutes the utilization unit 3. The utilization-side control unit 38 has a microcomputer, a memory, and the like provided for controlling the utilization unit 3, and can exchange control signals and the like with the outdoor unit 2.

Figure 3:
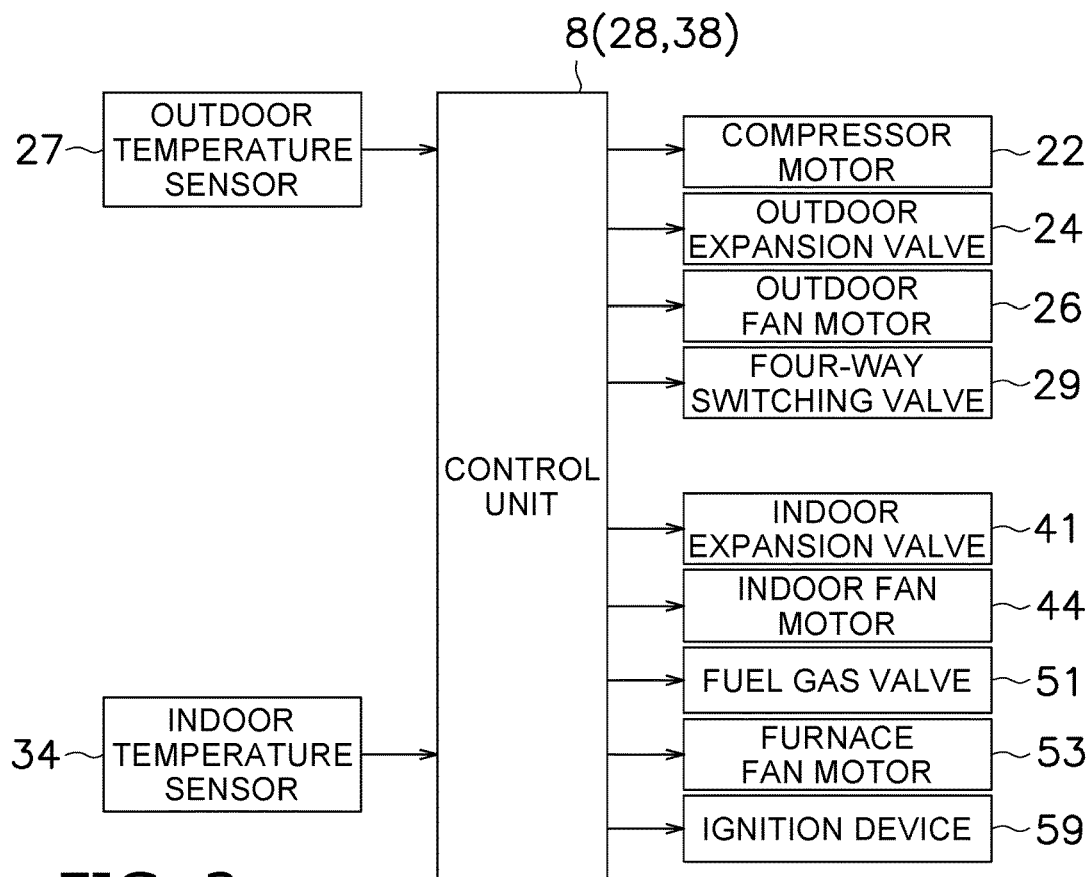
FIG. 3 is a control block diagram of the air conditioning system according to the first embodiment.

Then, as shown in FIG. 2, the utilization-side control unit 38 of the utilization unit 3 and the outdoor-side control unit 28 of the outdoor unit 2 constitute a control unit 8 that controls operation of the entire air conditioning system 1. As shown in FIG. 3, the control unit 8 is connected so as to be able to receive detection signals of various sensors 27 and 34, and the like. Here, FIG. 3 is a control block diagram of the air conditioning system 1. Then, the control unit 8 is configured to perform an air conditioning operation (a heating operation) by controlling various devices and valves 22, 24, 26, 29, 41, 44, 51, 53, and 59 on the basis of these detection signals and the like, that is, by controlling an operation of the heat pump unit 60 and the separate heat source unit 70. Here, the control unit 8 performs the heat pump heating operation that air-conditions (heats) the rooms 101 to 104 with the heat pump unit 60, and the separate heat source heating operation that air-conditions (heats) the rooms 101 to 104 with the separate heat source unit 70.

<Operation>

Next, an operation of the air conditioning operation (the heating operation) of the air conditioning system 1 will be described with reference to FIGS. 1 to 3. As described above, the heating operation of the air conditioning system 1 includes the heat pump heating operation for heating a room with the heat pump unit 60, and the separate heat source heating operation for heating a room with the separate heat source unit 70. Then, the heat pump heating operation and the separate heat source heating operation are performed by the control unit 8.

—Heat Pump Heating Operation—

In the heat pump heating operation, a flammable refrigerant in the refrigerant circuit 20 is suctioned into the compressor 21, and compressed to become a high-pressure gas state. The flammable refrigerant compressed in the compressor 21 is sent from the outdoor unit 2 to the indoor unit 4 of the utilization unit 3, via the four-way switching valve 29 in a heating state and the gas-refrigerant connection pipe 7.

The high-pressure flammable refrigerant sent to the indoor unit 4 of the utilization unit 3 is sent to the indoor heat exchanger 42. In the indoor heat exchanger 42, the high-pressure flammable refrigerant sent to the indoor heat exchanger 42 exchanges heat by the indoor fan 40 with indoor air F1 (F2) flowing in the air-blowing flow path 30*a*, to radiate heat. The flammable refrigerant with heat radiated in the indoor heat exchanger 42 is decompressed by the indoor expansion valve 41, and then sent from the indoor unit 4 of the utilization unit 3 to the outdoor unit 2 via the liquid-refrigerant connection pipe 6. Whereas, indoor air F3 heated in the indoor heat exchanger 42 exits the air-blowing flow path 30*a*, and is sent from the utilization unit 3 to the individual rooms 101 to 104 through the duct 9, for heating.

The high-pressure flammable refrigerant sent to the outdoor unit 2 is sent to the outdoor expansion valve 24, and decompressed by the outdoor expansion valve 24. The flammable refrigerant decompressed in the indoor expansion valve 24 is sent to the outdoor heat exchanger 23. The flammable refrigerant sent to the outdoor heat exchanger 23 exchanges heat with outdoor air supplied with the outdoor fan 25, to be evaporated in the outdoor heat exchanger 23. The flammable refrigerant evaporated in the outdoor heat exchanger 23 is sent to the compressor 21 via the four-way switching valve 29 in the heating state, and is suctioned into the compressor 21 again.

—Separate Heat Source Heating Operation—

In the separate heat source heating operation, high-temperature combustion gas is generated by opening the fuel gas valve 51 to supply fuel gas to the combustion unit 54, mixing with air taken into the furnace unit 5 of the utilization unit 3 via the air supply pipe 56 by the furnace fan 52 in the combustion unit 54, and igniting by the ignition device 59 to burn.

The combustion gas generated in the combustion unit 54 is sent to the furnace heat exchanger 55. The combustion gas sent to the furnace heat exchanger 55 is cooled by heat exchange by the indoor fan 40 with the indoor air F1 flowing in the air-blowing flow path 30a, in the furnace heat exchanger 55. The combustion gas cooled in the furnace heat exchanger 55 is discharged from the furnace unit 5 of the utilization unit 3 via the exhaust pipe 57. Whereas, the indoor air F2 (F3) heated in the furnace heat exchanger 55 exits the air-blowing flow path 30a, and is sent from the utilization unit 3 to the individual rooms 101 to 104 through the duct 9, for heating.

—Start Operation of Separate Heat Source Heating Operation—

Since the air conditioning system 1 uses a flammable refrigerant as the refrigerant sealed in the refrigerant circuit 20, it is necessary to consider a possibility of leakage of the flammable refrigerant from the refrigerant circuit 20. For example, if the separate heat source heating operation is performed while the flammable refrigerant is leaking, the leaked flammable refrigerant may be ignited by the furnace unit 5. In particular, if the separate heat source heating operation is started while the flammable refrigerant is leaking and staying in the air-blowing flow path 30a, the leaked flammable refrigerant may be ignited by the furnace unit 5.

Figure 4:
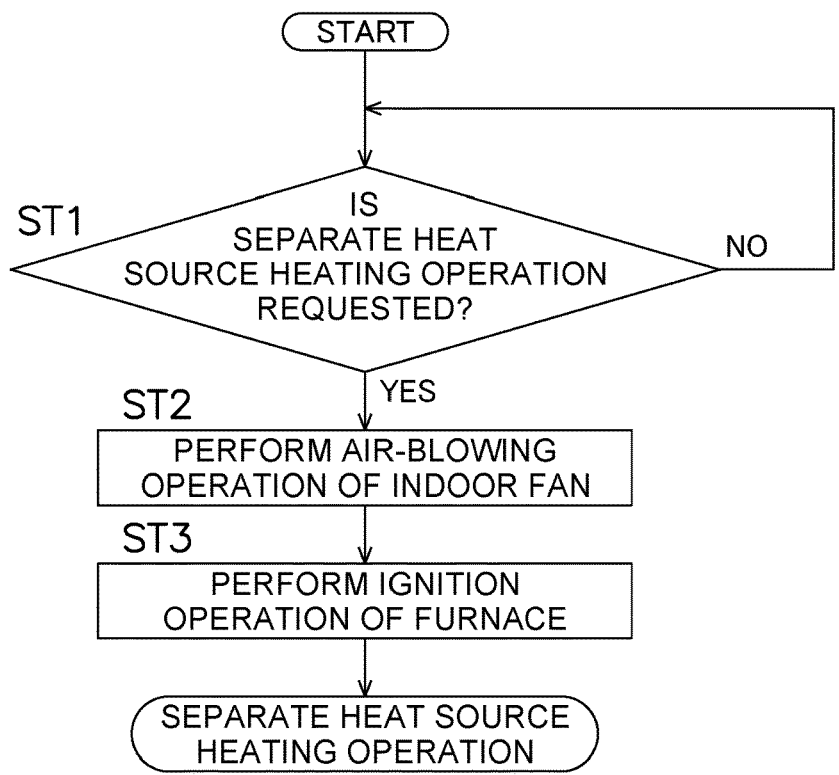
FIG. 4 is a flowchart showing a start operation of a separate heat source heating operation in the air conditioning system according to the first embodiment.

Therefore, here, as shown in FIG. 4, when starting air conditioning in the room with the separate heat source unit 70 (the separate heat source heating operation), the control unit 8 brings a state where the indoor fan 40 is in operation before causing an operation for burning fuel in the furnace unit 5. Here, FIG. 4 is a flowchart showing a start operation of the separate heat source heating operation in the air conditioning system 1.

First, when the separate heat source heating operation is requested in the air conditioning system 1 that is stopped (step ST1) by giving a command to the control unit 8 to perform the separate heat source heating operation or determining to perform the separate heat source heating operation by the control unit 8 that has received the command for performing the heating operation, in step ST2, the control unit 8 causes operation of the indoor fan 40 (that is, an air-blowing operation of the indoor fan). This causes, in the air conditioning system 1, an upward air flow from the air inflow port 32 to the air outflow port 31 in the air-blowing flow path 30a. At this time, even in a state where the flammable refrigerant leaks and stays in the air-blowing flow path 30a, the state is eliminated by the operation of the indoor fan 40. Note that, in step ST2, it is preferable to operate the indoor fan 40 for about 30 seconds.

Next, in step ST3, the control unit 8 causes the operation for burning fuel in the furnace unit 5 (that is, an ignition operation of the furnace) while the indoor fan 40 is in operation. As a result, in the air conditioning system 1, the separate heat source heating operation is started by burning fuel in the combustion unit 54 to generate combustion gas, and generating a flow of the combustion gas passing through the furnace heat exchanger 55 and exhausted through the exhaust pipe 57. At this time, even in a case where the flammable refrigerant is leaking into the air-blowing flow path 30a, the possibility of ignition of the flammable refrigerant due to the operation for burning fuel in the furnace unit 5 is reduced, since the process of operating the indoor fan 40 in step ST2 eliminates the state where the leaked flammable refrigerant stays in the an air-blowing flow path 30a.

<Characteristics>

Next, characteristics of the air conditioning system 1 of the present embodiment will be described.

Here, as described above, in the air conditioning system 1 having the heat pump unit 60 that air-conditions the room with the refrigerant circuit 20 in which the flammable refrigerant is sealed, and the separate heat source unit 70 that air-conditions the room with the furnace 5, the control unit 8 brings a state where the indoor fan 40 that sends air into the room through the air-blowing flow path 30a is in operation before causing operation for burning fuel in the furnace 5, in starting air conditioning in the room with the separate heat source unit 70.

Therefore, here, it is possible to eliminate a state where the leaked flammable refrigerant stays in the air-blowing flow path 30a, even if the flammable refrigerant is leaking before starting of air conditioning in the room with the separate heat source unit 70 (the furnace 5), by bringing a state where the indoor fan 40 is in operation before causing operation for burning fuel in the furnace 5. For example, in a case where the furnace 5 is arranged below the indoor heat exchanger 42, it is possible to eliminate a state where the leaked flammable refrigerant stays around the furnace 5.

This can reduce, here, a possibility of a flammable refrigerant being ignited by the furnace 5, in starting air conditioning in the room with the separate heat source unit 70 while the flammable refrigerant is leaking.

Modified Example

—A—

Figure 5:
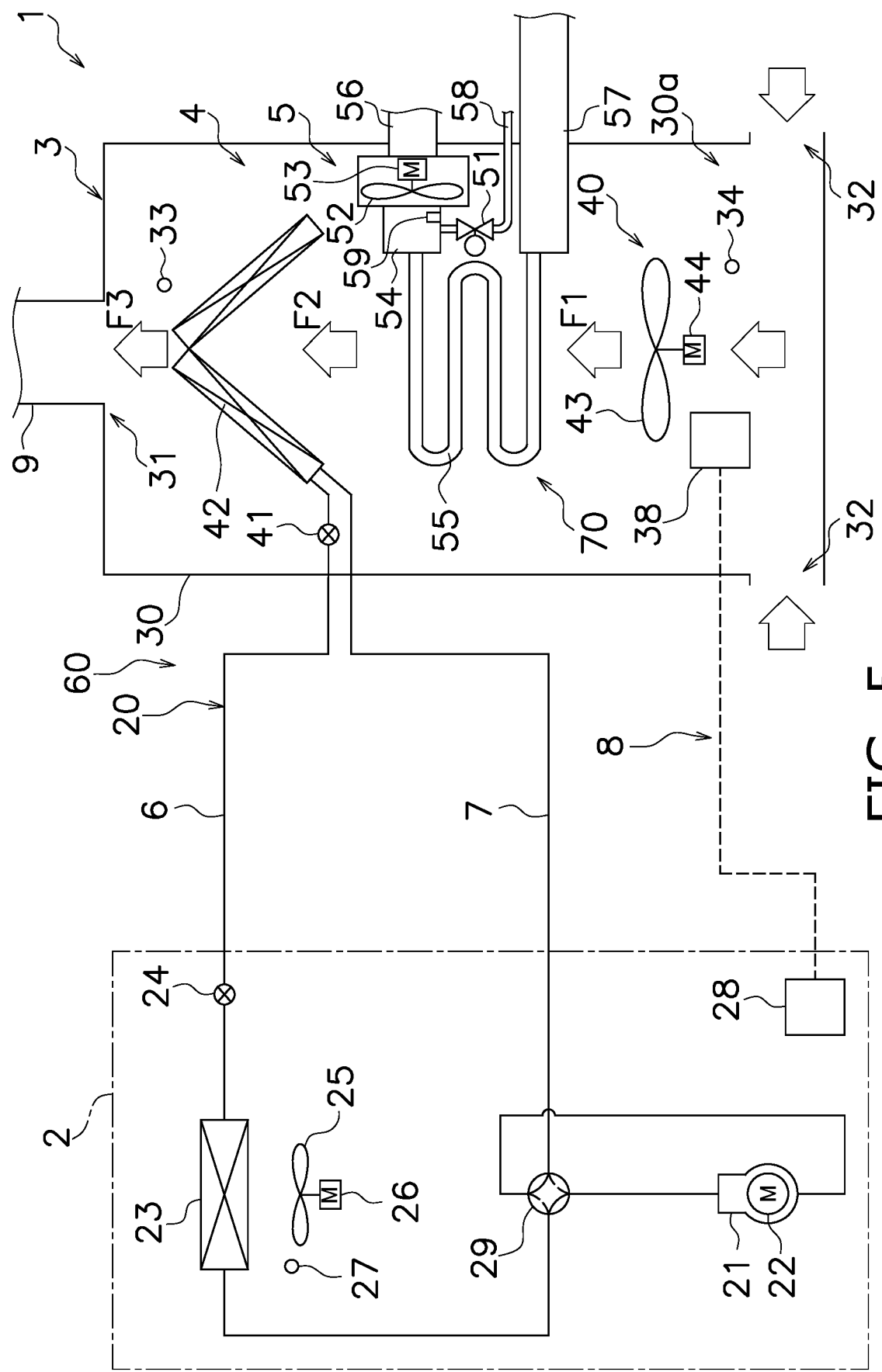
FIG. 5 is a schematic configuration diagram of an air conditioning system according to Modified example A of the first embodiment.
Figure 6:
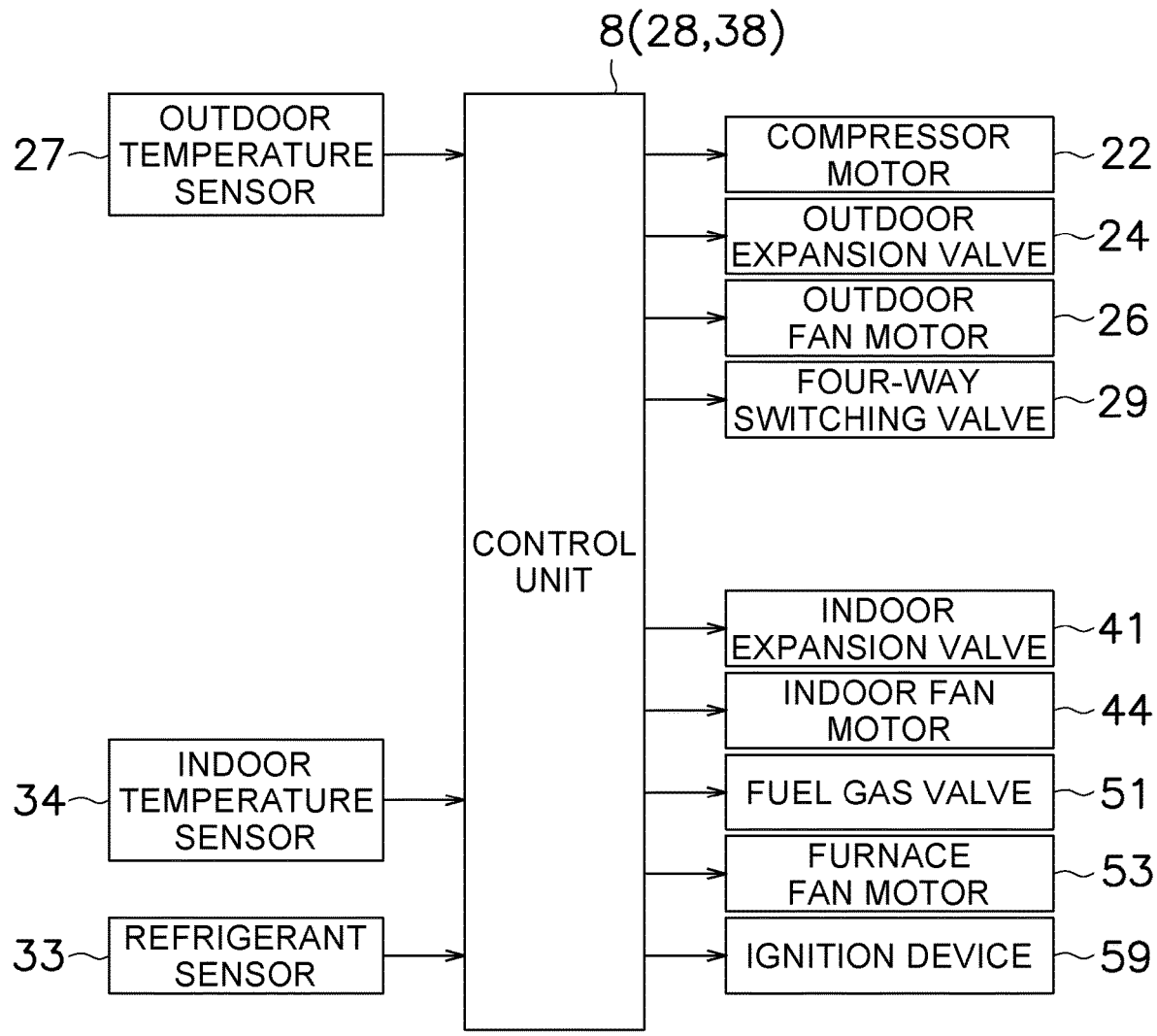
FIG. 6 is a control block diagram of the air conditioning system according to Modified example A of the first embodiment.

In the first embodiment, means that detects the flammable refrigerant is not provided, but as shown in FIGS. 5 and 6, a refrigerant sensor 33 that detects a flammable refrigerant may be provided in the air-blowing flow path 30a. Here, the refrigerant sensor 33 is provided on a downstream side of the indoor heat exchanger 42 (the refrigerant heat exchanger) with respect to a flow direction of air in the air-blowing flow path 30a. Here, FIGS. 5 and 6 are a schematic configuration diagram and a control block diagram of the air conditioning system 1 according to Modified example A.

In such a configuration in which the refrigerant sensor 33 is provided in the air-blowing flow path 30a, the refrigerant sensor 33 can be used to detect whether or not a flammable refrigerant is leaking. In particular, here, in a portion, in the air-blowing flow path 30a, on a downstream side of the refrigerant heat exchanger 42 through which the air containing the leaked flammable refrigerant passes, the leaked flammable refrigerant can be reliably detected.

Therefore, in this configuration, when the refrigerant sensor 33 detects a flammable refrigerant, the control unit 8 can quickly stop air conditioning in the room with the heat pump unit 60 (the heat pump heating operation) and air conditioning in the room with the separate heat source unit 70 (the separate heat source heating operation). In addition, when starting the separate heat source heating operation, it may be possible to detect leakage of a flammable refrigerant with the refrigerant sensor 33 without performing the process of steps ST1 to ST3 of the first embodiment.

However, even if the flammable refrigerant is leaking, in a state where the leaked flammable refrigerant stays in only a part of the air-blowing flow path 30a and no air flow occurs in the air-blowing flow path 30a, the leaked flammable refrigerant cannot be detected depending on an arrangement of the refrigerant sensor 33 that detects flammable refrigerant, and it may not be known whether or not the flammable refrigerant is leaking. For example, in a case where the furnace 5 is arranged below the indoor heat exchanger 42, the leaked flammable refrigerant stays around the furnace 5, but the leaked flammable refrigerant may not stay around the refrigerant sensor 33 arranged on a downstream side of (here, above) the indoor heat exchanger 42. In such a case, it is difficult for the refrigerant sensor 33 to detect the leaked flammable refrigerant unless an air flow occurs in the air-blowing flow path 30a.

Figure 7:
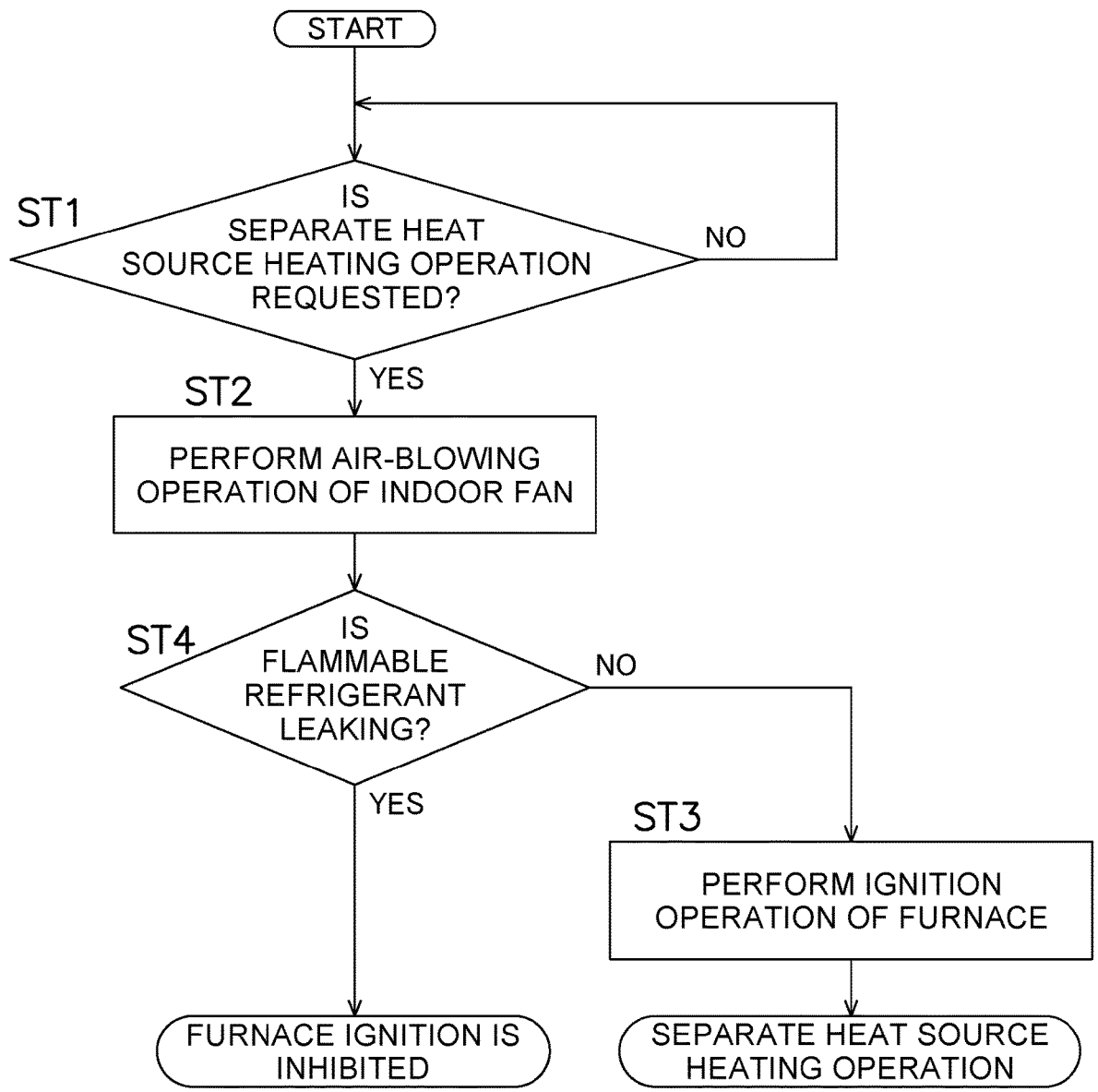
FIG. 7 is a flowchart showing a start operation of a separate heat source heating operation in the air conditioning system according to Modified example A of the first embodiment.

Therefore, here, as shown in FIG. 7, similarly to the first embodiment, when starting the separate heat source heating operation, the control unit 8 performs a process (steps ST1 to ST3) for bringing a state where the indoor fan 40 is in operation, and also a process of using the refrigerant sensor 33 (step ST4), before causing an operation for burning fuel in the furnace unit 5. Here, FIG. 7 is a flowchart showing a start operation of the separate heat source heating operation in the air conditioning system 1 according to Modified example A.

First, similarly to the first embodiment, when the separate heat source heating operation is requested in the air conditioning system 1 that is stopped (step ST1), in step ST2, the control unit 8 causes operation of the indoor fan 40 (that is, an air-blowing operation of the indoor fan). This causes, in the air conditioning system 1, an upward air flow from the air inflow port 32 to the air outflow port 31 in the air-blowing flow path 30a. At this time, even in a state where the flammable refrigerant leaks and stays in the air-blowing flow path 30a, the state is eliminated by the operation of the indoor fan 40. Moreover, even if the leaked flammable refrigerant stays only in a part of the air-blowing flow path 30a, the air flow generated in the air-blowing flow path 30a allows the refrigerant sensor 33 to detect the leaked flammable refrigerant.

Next, in step ST4, the control unit 8 determines whether or not the flammable refrigerant is leaking from the refrigerant circuit 20 while the indoor fan 40 is in operation. Here, the control unit 8 determines that the flammable refrigerant is leaking when the refrigerant sensor 33 detects the flammable refrigerant, and determines that the flammable refrigerant is not leaking when the refrigerant sensor 33 does not detect the flammable refrigerant.

Then, in step ST4, similarly to the first embodiment, when the flammable refrigerant is not leaking while the indoor fan 40 is in operation, the control unit 8 shifts to the process of step ST3, and causes an operation for burning fuel in the furnace unit 5 (that is, an ignition operation of the furnace) while the indoor fan 40 is in operation. This causes the air conditioning system 1 to start the separate heat source heating operation.

Whereas, in step ST4, if the flammable refrigerant is leaking while the indoor fan 40 is in operation, the control unit 8 does not cause the operation for burning fuel in the furnace unit 5. This inhibits starting of the separate heat source heating operation in the air conditioning system 1, and can prevent ignition of the leaked flammable refrigerant.

Thus, here, as described above, before the operation for burning fuel in the furnace 5 is performed, leakage of a flammable refrigerant is also checked, in addition to the operation of the indoor fan 40.

As a result, here, the same effects as those of the first embodiment are obtained, and a room can be air-conditioned by the separate heat source unit 70 when a flammable refrigerant is not leaking, while the room can be prevented from being air-conditioned by the separate heat source unit 70 if the flammable refrigerant is leaking. Further, here, since leakage of the flammable refrigerant is detected while the indoor fan 40 is operating to generate the air flow, the leaked flammable refrigerant can be reliably detected by the refrigerant sensor 33.

Further, here, a refrigerant sensor may be further arranged near the indoor fan 40. For example, when a sirocco fan is used as the indoor fan 40, the refrigerant sensor may be arranged near a suction port. Arranging the refrigerant sensor at such a position enables quick detection of the presence or absence of leakage of the flammable refrigerant when the indoor fan 40 is rotated.

—B—

In the first embodiment and Modified example A, in the utilization unit 3, the furnace heat exchanger 55 of the furnace unit 5 constituting the separate heat source unit 70 is arranged on a windward side of the indoor heat exchanger 42 of the indoor unit 4 constituting the heat pump unit 60 (on an upstream side of the indoor heat exchanger 42 with respect to a flow direction of air in the air-blowing flow path 30a). However, the arrangement of both the heat exchangers 42 and 55 is not limited to this.

Figure 8:
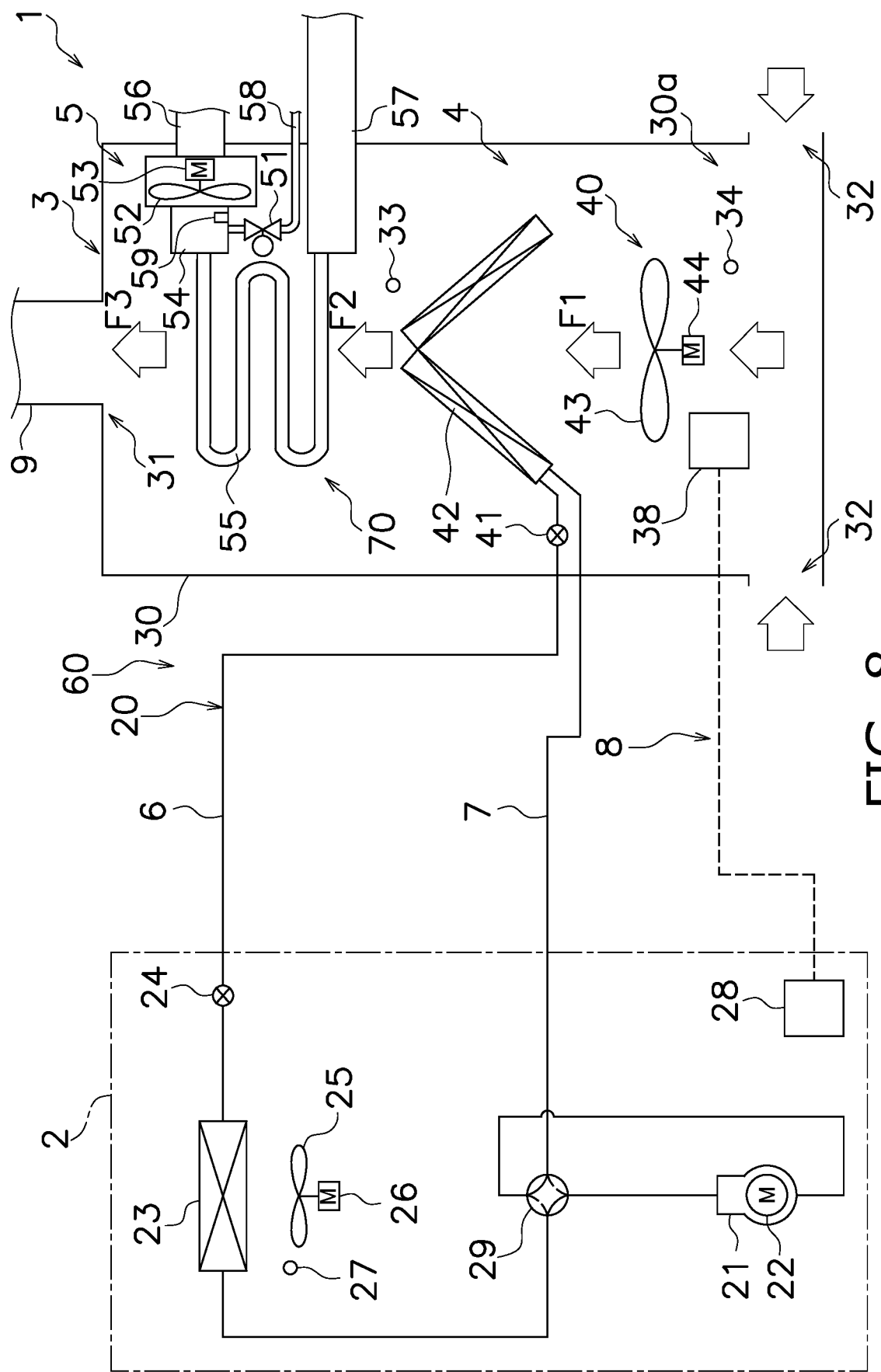
FIG. 8 is a schematic configuration diagram of an air conditioning system according to Modified example B of the first embodiment.

For example, as shown in FIG. 8, the furnace heat exchanger 55 of the furnace unit 5 as the separate heat source unit 70 may be arranged on a leeward side of the indoor heat exchanger 42 of the indoor unit 4 as the heat pump unit 60 (on a downstream side of the indoor heat exchanger 42 with respect to a flow direction of the air in the air-blowing flow path 30a). Here, the refrigerant sensor 33 is provided on a downstream side of the indoor heat exchanger 42 and on an upstream side of the furnace indoor heat exchanger 42 with respect to a flow direction of the air in the air-blowing flow path 30a.

Even in this case, effects similar to those of the first embodiment and Modified example A can be obtained. Further, here, the refrigerant sensor 33 is provided on the upstream side of the furnace 5 with respect to a flow direction of the air in the air-blowing flow path 30a. Therefore, the leaked flammable refrigerant can be reliably detected in a portion, in the air-blowing flow path 30a, on a downstream side of the indoor heat exchanger 42 (the refrigerant heat exchanger) through which air containing the leaked flammable refrigerant passes, and portion on an upstream side of the furnace 5 that may become an ignition source.

—C—

In the first embodiment and Modified examples A and B, the furnace unit 5 constitutes the separate heat source unit 70, but the separate heat source unit 70 is not limited to this.

Figure 9:
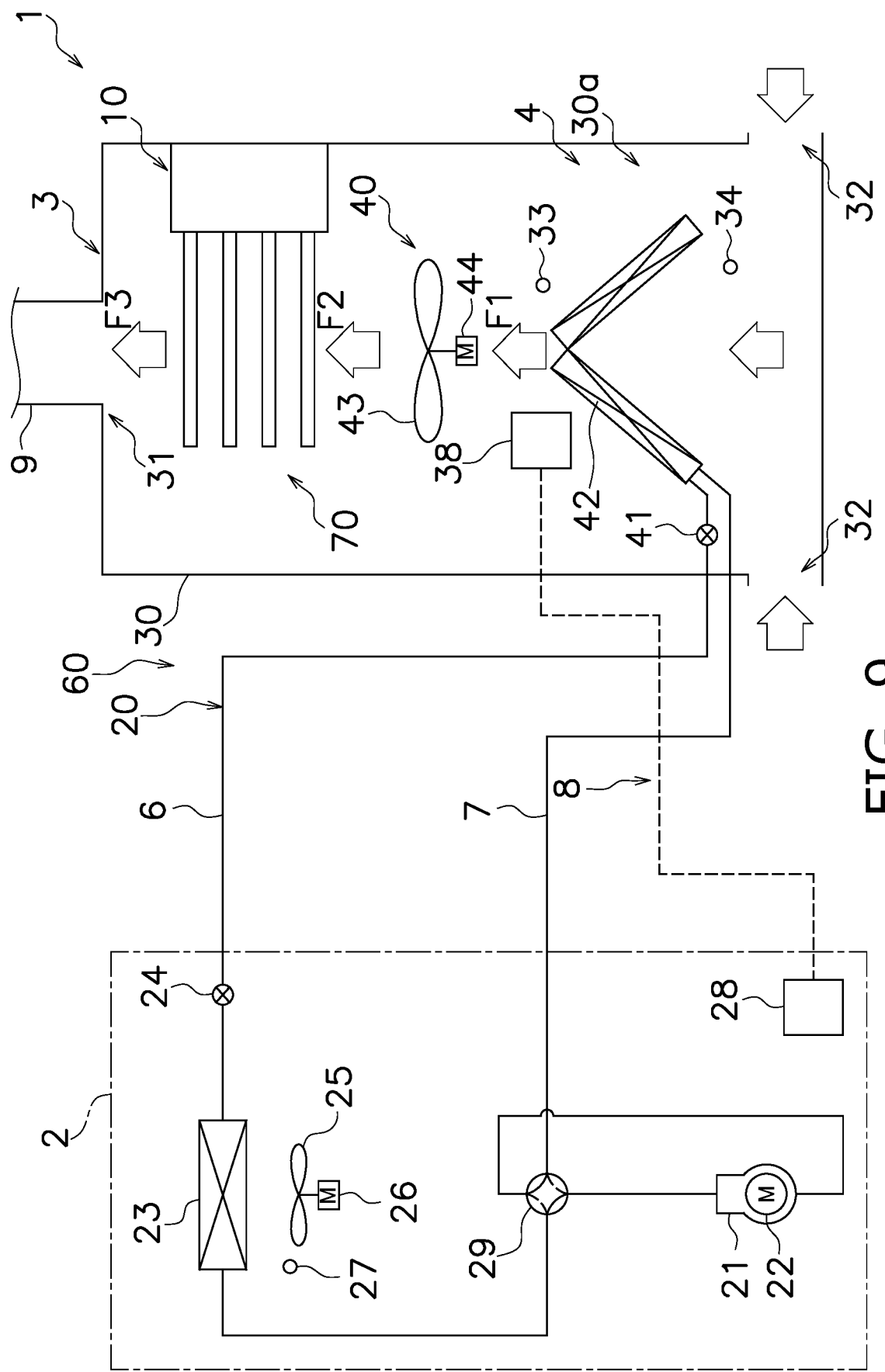
FIG. 9 is a schematic configuration diagram of an air conditioning system according to Modified example C of the first embodiment.
Figure 10:
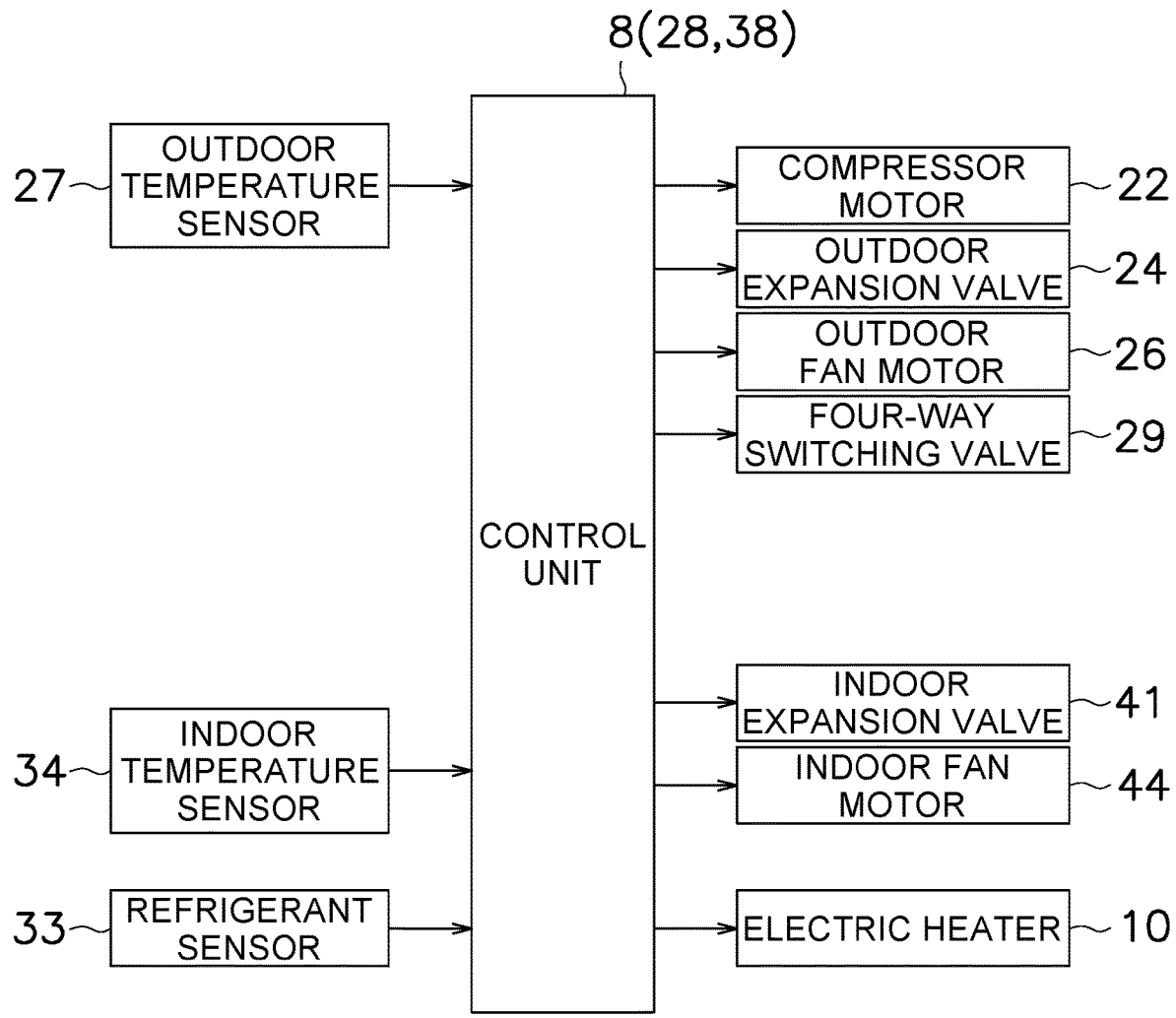
FIG. 10 is a control block diagram of the air conditioning system according to Modified example C of the first embodiment.

For example, as shown in FIGS. 9 and 10, an electric heater 10 that heats air with heat generated by energization may constitute the separate heat source unit 70. Here, in order to reduce the possibility of ignition of the flammable refrigerant even if the flammable refrigerant leaking from the indoor heat exchanger 42 comes into contact with the electric heater 10, energy of the electric heater 10 is preferably 25 kW or less. Here, in the air-blowing flow path 30a from the air inflow port 32 to the air outflow port 31 formed in the housing 30 of the utilization unit 3, the indoor heat exchanger 42 of the indoor unit 4 constituting the heat pump unit 60, the indoor fan 40, and the electric heater 10 constituting the separate heat source unit 70 are provided sequentially from a windward side to a leeward side. Here, the refrigerant sensor 33 is provided on a downstream side of the indoor heat exchanger 42 and on an upstream side of the electric heater 10 with respect to a flow direction of the air in the air-blowing flow path 30a.

Even in this case, similarly to the first embodiment and Modified examples A and B, a start operation of the separate heat source heating operation, that is, the process of steps ST1 to ST3 in FIG. 4 or the process of steps ST1 to ST4 in FIG. 7 can be performed. However, when the electric heater 10 is used as the separate heat source unit 70, the operation for burning fuel (the ignition operation of the furnace) in the furnace 5 of step ST3 is to be the operation for generating heat by energization (an energization operation of the electric heater) in the electric heater 10. This enables, here, effects similar to those of the first embodiment and Modified example A to be obtained.

—D—

In the first embodiment and Modified examples A to C, the air-blowing flow path 30a is formed so that air flows upward from the air inflow port 32 toward the air outflow port 31, but the present invention is not limited to this. For example, although not illustrated here, the air-blowing flow path 30a may be formed so that air flows downward from the air inflow port 32 toward the air outflow port 31, and may be formed so that air flows horizontally. In this case, along the flow directions of the air, the indoor fan 40, the indoor heat exchanger 42 constituting the heat pump unit 60, the furnace heat exchanger 55 constituting the separate heat source unit 70, and the electric heater 10 are provided.

—E—

In the first embodiment and the modified examples A to D, the room is heated by the refrigerant circuit 20 constituting the heat pump unit 60 (the heat pump heating operation). However, in addition to this operation, the room can also be cooled by the refrigerant circuit 20 constituting the heat pump unit 60 by switching the four-way switching valve 29 to a cooling state. That is, as the air conditioning in the room with the refrigerant circuit 20 constituting the heat pump unit 60, not only heating in the room but also cooling in the room may be performed. Further, the four-way switching valve 29 may be omitted from the refrigerant circuit 20, and only the indoor cooling may be performed as the air conditioning in the room.

(2) Second Embodiment

<Configuration>

Figure 11:
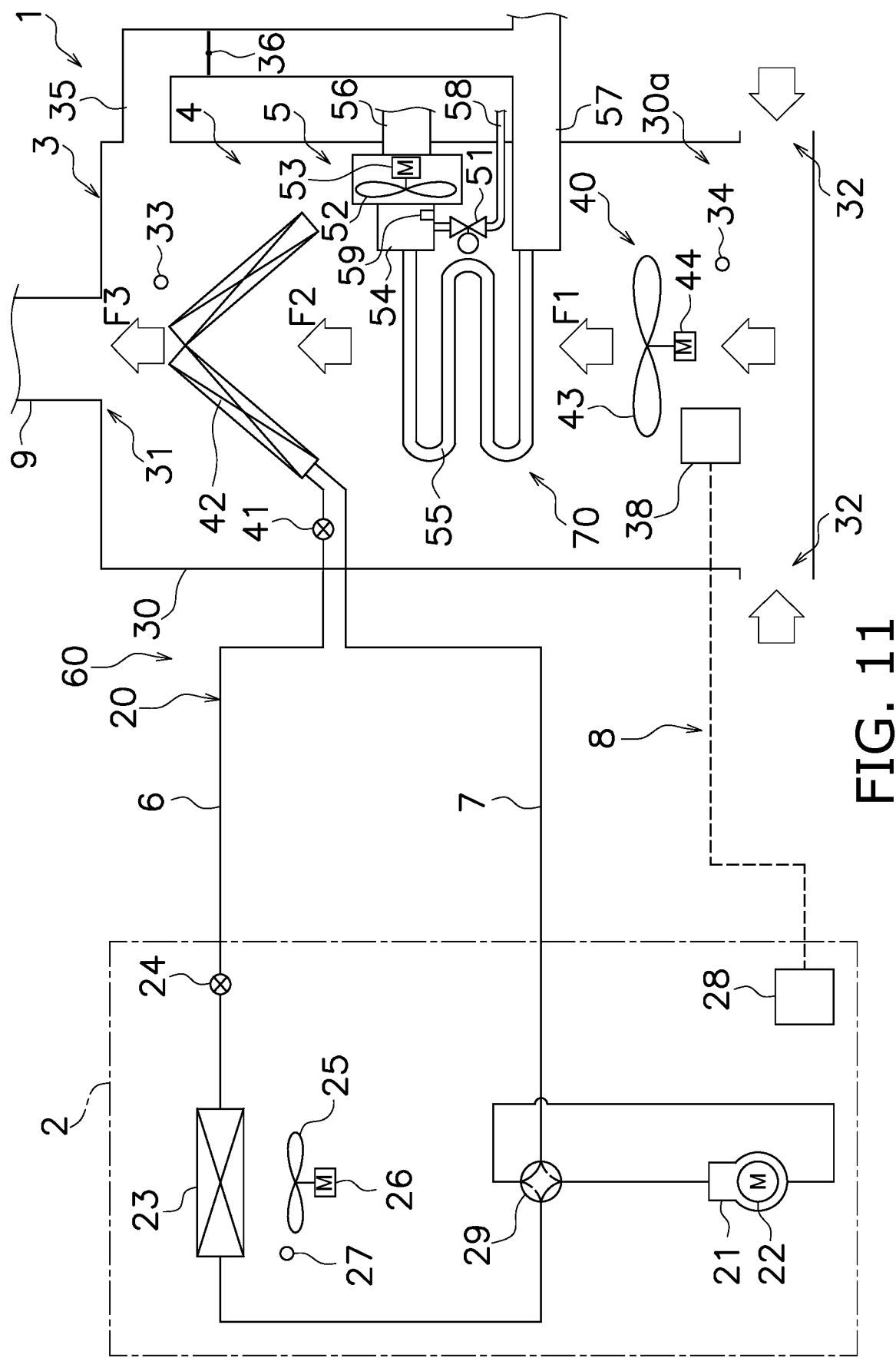
FIG. 11 is a schematic configuration diagram of the air conditioning system according to the second embodiment.
Figure 12:
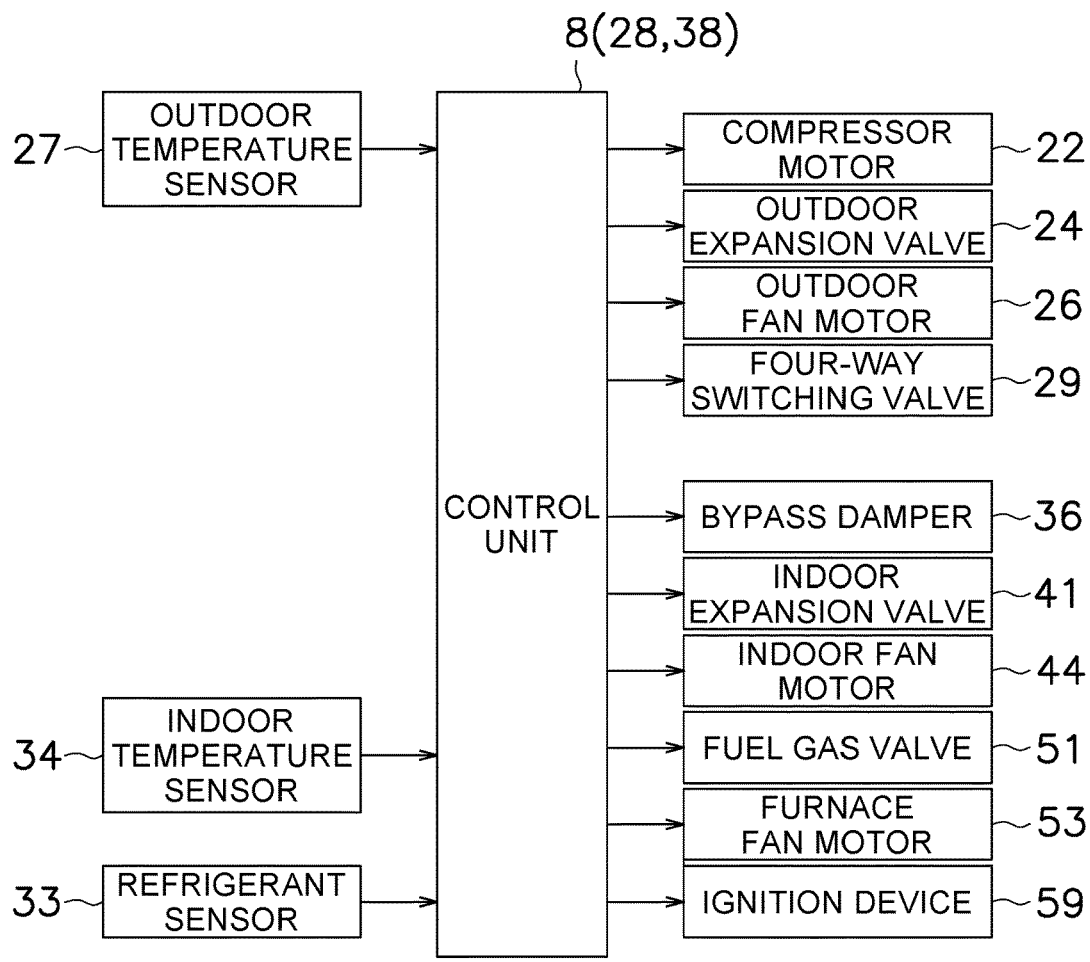
FIG. 12 is a control block diagram of the air conditioning system according to the second embodiment.

FIG. 1 is an exemplary view showing an arrangement of an air conditioning system 1 according to a second embodiment. FIG. 11 is a schematic configuration diagram of the air conditioning system 1 according to the second embodiment. FIG. 12 is a control block diagram of the air conditioning system 1 according to the second embodiment.

Similarly to the first embodiment, the air conditioning system 1 of the present embodiment is a device used for air conditioning of houses or buildings. Here, description of a structure of the house or the building in which the air conditioning system 1 is installed will be omitted.

Similarly to the first embodiment, the air conditioning system 1 of the present embodiment is a so-called duct air conditioning system, and mainly has an outdoor unit 2, a utilization unit 3, refrigerant connection pipes 6 and 7, and an air-blowing duct 9. Then, similarly to the first embodiment, the outdoor unit 2, an indoor unit 4 that is a part of the utilization unit 3, and the refrigerant connection pipes 6 and 7 constitute a heat pump unit 60 that air-conditions (heats) a room with a vapor compression refrigerant circuit 20. Further, similarly to the first embodiment, a furnace unit 5 (a furnace), which is a part of the utilization unit 3, constitutes a separate heat source unit 70 that air-conditions (heats) a room with a heat source (here, heat generated by combustion of fuel) separate from the heat pump unit 60. Further, similarly to the first embodiment, the utilization unit 3 has an indoor fan 40 in the housing 30 of the utilization unit 3. Then, similarly to the first embodiment, a utilization-side control unit 38 of the utilization unit 3 and an outdoor-side control unit 28 of the outdoor unit 2 constitute a control unit 8 that controls operation of the entire air conditioning system 1.

Details of a configuration of the air conditioning system 1 of the present embodiment will be described below. However, here, the same configuration as that of the first embodiment will be substituted with the description of the configuration of the first embodiment, and a configuration different from the configuration of the first embodiment will be described.

Similarly to Modified example A of the first embodiment, in the utilization unit 3 of the present embodiment, a refrigerant sensor 33 that detects a flammable refrigerant is provided in an air-blowing flow path 30a. Here, the refrigerant sensor 33 is provided on a downstream side of the indoor heat exchanger 42 (the refrigerant heat exchanger) with respect to a flow direction of air in the air-blowing flow path 30a.

Further, similarly to the first embodiment, in the utilization unit 3 of the present embodiment, the furnace unit 5 has an exhaust pipe 57 as an exhaust flow path that exhausts combustion gas generated by combustion of fuel. Then, here, as shown in FIG. 11, a bypass pipe 35 as a bypass flow path connecting the exhaust pipe 57 and the air-blowing flow path 30a is provided. The bypass pipe 35 is provided with a bypass damper 36 as a bypass opening and closing mechanism that opens and closes the bypass pipe 35. Further, here, the bypass pipe 35 is connected to a portion, in the air-blowing flow path 30a, on a downstream side of the indoor heat exchanger 42 with respect to a flow direction of air in the air-blowing flow path 30a.

As shown in FIG. 12, the control unit 8 of the present embodiment is connected so as to be able to receive detection signals of various sensors 27, 33, and 34, and the like including the refrigerant sensor 33. Then, the control unit 8 is configured to control various devices including the bypass damper 36 and valves 22, 24, 26, 29, 36, 41, 44, 51, 53, and 59 on the basis of these detection signals and the like.

<Operation>

Next, an operation of the air conditioning system 1 of the present embodiment will be described with reference to FIGS. 1, 11, and 12. An air conditioning operation (a heating operation) of the air conditioning system 1 of the present embodiment includes a heat pump heating operation for air conditioning (heating) a room with the heat pump unit 60, and a separate heat source heating operation for air conditioning (heating) a room with the separate heat source unit 70. Note that the heat pump heating operation and the separate heat source heating operation are similar to the heat pump heating operation and the separate heat source heating operation of the first embodiment except that these are performed with the bypass damper 36 being in a closed state, and therefore the description thereof will be omitted here. Then, in the following, description will be made on an exhaust operation of a flammable refrigerant when leakage of the flammable refrigerant is detected by the refrigerant sensor 33.

—Exhaust Operation When Flammable Refrigerant Leaks—

In the air conditioning system 1 of the present embodiment, since a flammable refrigerant is used as a refrigerant sealed in a refrigerant circuit 20, it is necessary to consider a possibility of leakage of the flammable refrigerant from the refrigerant circuit 20. For example, if a room is air-conditioned by the separate heat source unit 70 (the separate heat source heating operation) while the flammable refrigerant is leaking, the leaked flammable refrigerant may be ignited by the furnace unit 5. Therefore, when leakage of the flammable refrigerant is detected by using the refrigerant sensor 33, the leaked flammable refrigerant should be quickly exhausted from the air-blowing flow path 30a. Further, not only when the room is air-conditioned by the separate heat source unit 70, even when the room is air conditioned by the heat pump unit 60 (the heat pump heating operation) or when the air conditioning system 1 is stopped, the leaked flammable refrigerant should be quickly exhausted from the air-blowing flow path 30a.

Figure 13:
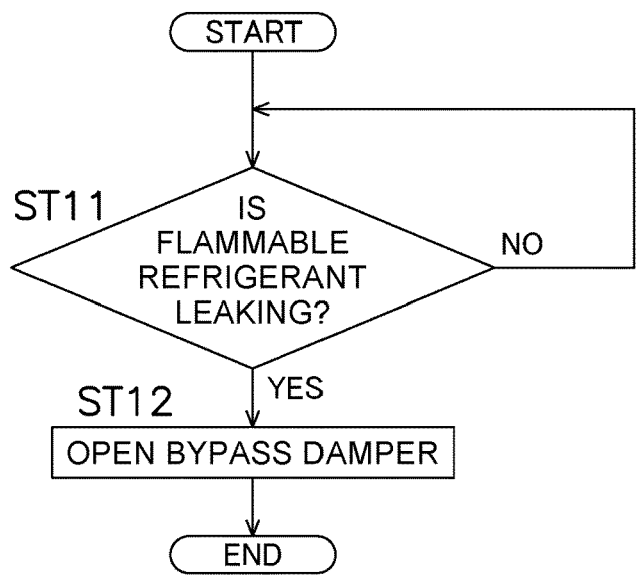
FIG. 13 is a flowchart showing an exhaust operation when a flammable refrigerant leaks in the air conditioning system according to the second embodiment.
Figure 14:
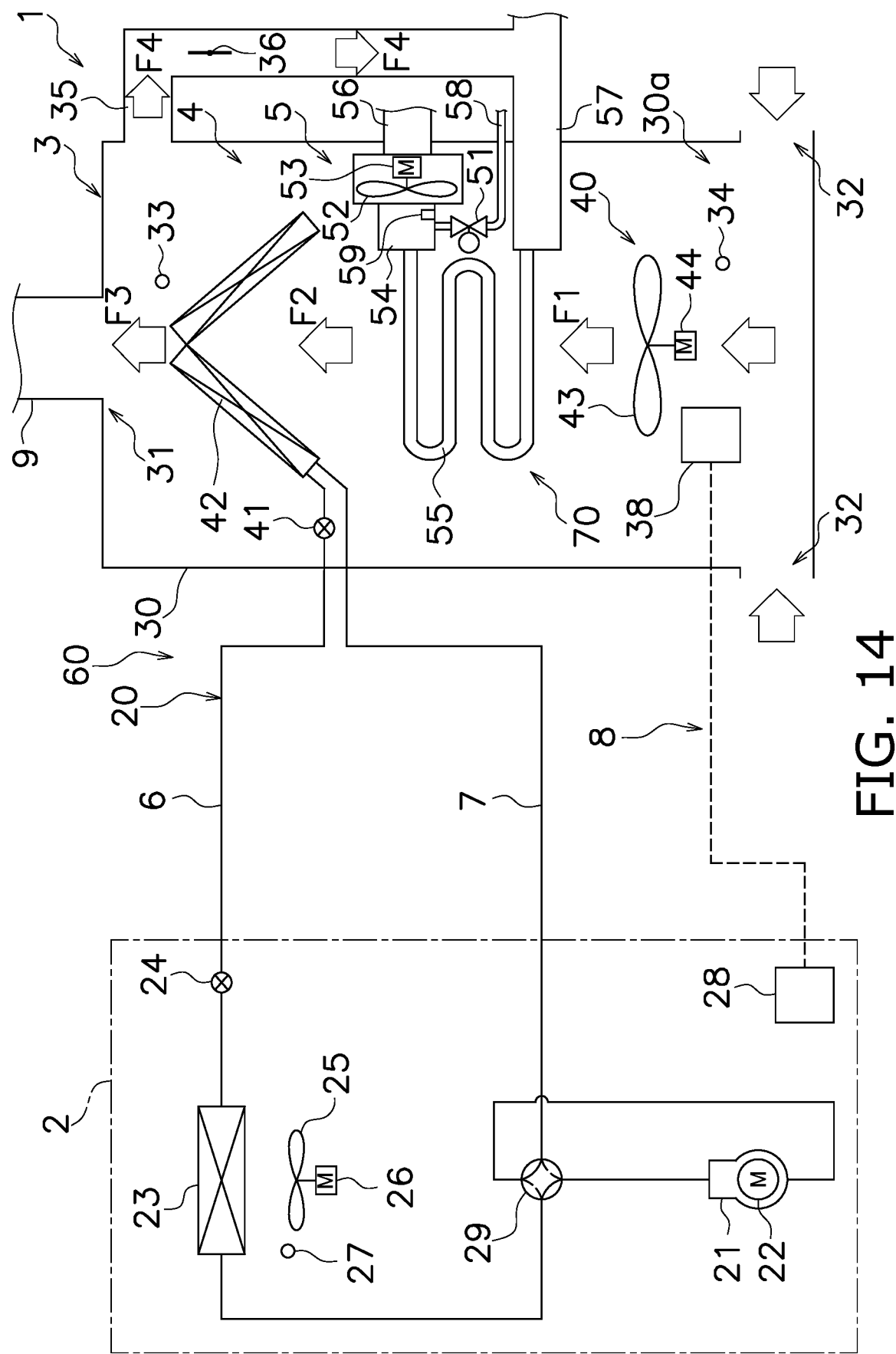
FIG. 14 is a schematic configuration diagram of the air conditioning system, added with an air flow due to the exhaust operation.

Therefore, here, as shown in FIGS. 13 and 14, when the flammable refrigerant leaks, the control unit 8 brings the bypass damper 36 (the bypass opening and closing mechanism) into an open state. Here, FIG. 13 is a flowchart showing an exhaust operation when the flammable refrigerant leaks in the air conditioning system 1, and FIG. 14 is a schematic configuration diagram of the air conditioning system 1, added with an air flow due to the exhaust operation.

First, in step ST11, the control unit 8 determines whether or not a flammable refrigerant is leaking from the refrigerant circuit 20. Here, the control unit 8 determines that the flammable refrigerant is leaking when the refrigerant sensor 33 detects the flammable refrigerant, and determines that the flammable refrigerant is not leaking when the refrigerant sensor 33 does not detect the flammable refrigerant.

Then, in step ST11, when the flammable refrigerant is not leaking, the control unit 8 shifts to a process of step ST12 to bring the bypass damper 36 into an open state (opening of the bypass damper).

This brings a state where, in the air conditioning system 1, air in the air-blowing flow path 30a is allowed to be exhausted to the outside through the bypass duct 35 as the bypass flow path and the exhaust pipe 57 as the exhaust flow path. Then, if a timing at which the leakage of the flammable refrigerant is detected is when the room is air-conditioned by the heat pump unit 60 or the separate heat source unit 70, air containing the leaked flammable refrigerant is exhausted through the bypass duct 35 and the exhaust pipe 57 as in an air flow F4 shown in FIG. 14, since the indoor fan 40 is in operation. Further, when a timing at which the leakage of the flammable refrigerant is detected is when the operation of the air conditioning system 1 is stopped, air containing the leaked flammable refrigerant is exhausted through the bypass duct 35 and the exhaust pipe 57 by opening the bypass damper and operating the indoor fan 40. Note that, at the time of this exhaust operation, it is preferable to also operate the furnace fan 52 in order to form an air flow from the exhaust pipe 57 to the outside.

<Characteristics>

Next, characteristics of the air conditioning system 1 of the present embodiment will be described.

—A—

Here, as described above, in the air conditioning system 1 having the heat pump unit 60 that air-conditions the room with the refrigerant circuit 20 in which the flammable refrigerant is sealed, and the separate heat source unit 70 that air-conditions the room with the furnace 5, there are provided the bypass pipe 35 (the bypass flow path) connecting the air-blowing flow path 30a and the exhaust pipe 57 (the exhaust flow path), and the bypass damper 36 (the bypass opening and closing mechanism) that opens and closes the bypass flow path 35. Then, when the flammable refrigerant leaks, the control unit 8 brings the bypass opening and closing mechanism 36 into an open state.

That is, here, providing the bypass flow path 35 and the bypass opening and closing mechanism 36 allows the exhaust flow path 57 of the furnace 5 to be used to exhaust the air in the air-blowing flow path 30a. Then, by using this configuration to bring the bypass opening and closing mechanism 36 into an open state when the flammable refrigerant leaks, the leaked flammable refrigerant can be exhausted from the air-blowing flow path 30a.

This makes it possible to, here, quickly exhaust the leaked flammable refrigerant from the air-blowing flow path 30a to reduce the possibility of ignition by the furnace 5, when the room is air-conditioned (heated) by the separate heat source unit 70 while the flammable refrigerant is leaking.

In addition, this exhaust operation can be applied not only when the room is air-conditioned by the separate heat source unit 70. Therefore, the leaked flammable refrigerant can be exhausted from the air-blowing flow path 30a even when the room is air conditioned by the heat pump unit 60 (the heat pump heating operation) or when the air conditioning system 1 is stopped.

—B—

Further, here, as described above, the bypass flow path 35 is connected to a portion, in the air-blowing flow path 30a, on a downstream side of the indoor heat exchanger 42 (the refrigerant heat exchanger) with respect to a flow direction of air in the air-blowing flow path 30a.

This enables, here, reliable exhaust of the leaked flammable refrigerant in a portion, in the air-blowing flow path 30a, on a downstream side of the refrigerant heat exchanger 42 through which air containing the leaked flammable refrigerant passes.

—C—

Further, here, as described above, the refrigerant sensor 33 that detects the flammable refrigerant is provided in the air-blowing flow path 30a.

This enables, here, the refrigerant sensor 33 to be used to detect whether or not a flammable refrigerant is leaking.

—D—

Further, here, as described above, the refrigerant sensor 33 is provided on the downstream side of the refrigerant heat exchanger 42 with respect to a flow direction of air in the air-blowing flow path 30a.

As a result, here, in a portion, in the air-blowing flow path 30a, on the downstream side of the refrigerant heat exchanger 42 through which air containing the leaked flammable refrigerant passes, the leaked flammable refrigerant can be reliably detected.

Modified Example

—A—

In the first embodiment, since the air outflow port 31 of the air-blowing flow path 30a communicates with inside of the room during the exhaust operation by the bypass pipe 35 (the bypass flow path) and the bypass damper 36 (the bypass opening and closing mechanism) described above, some of the leaked flammable refrigerant will also be sent into the room.

Figure 15:
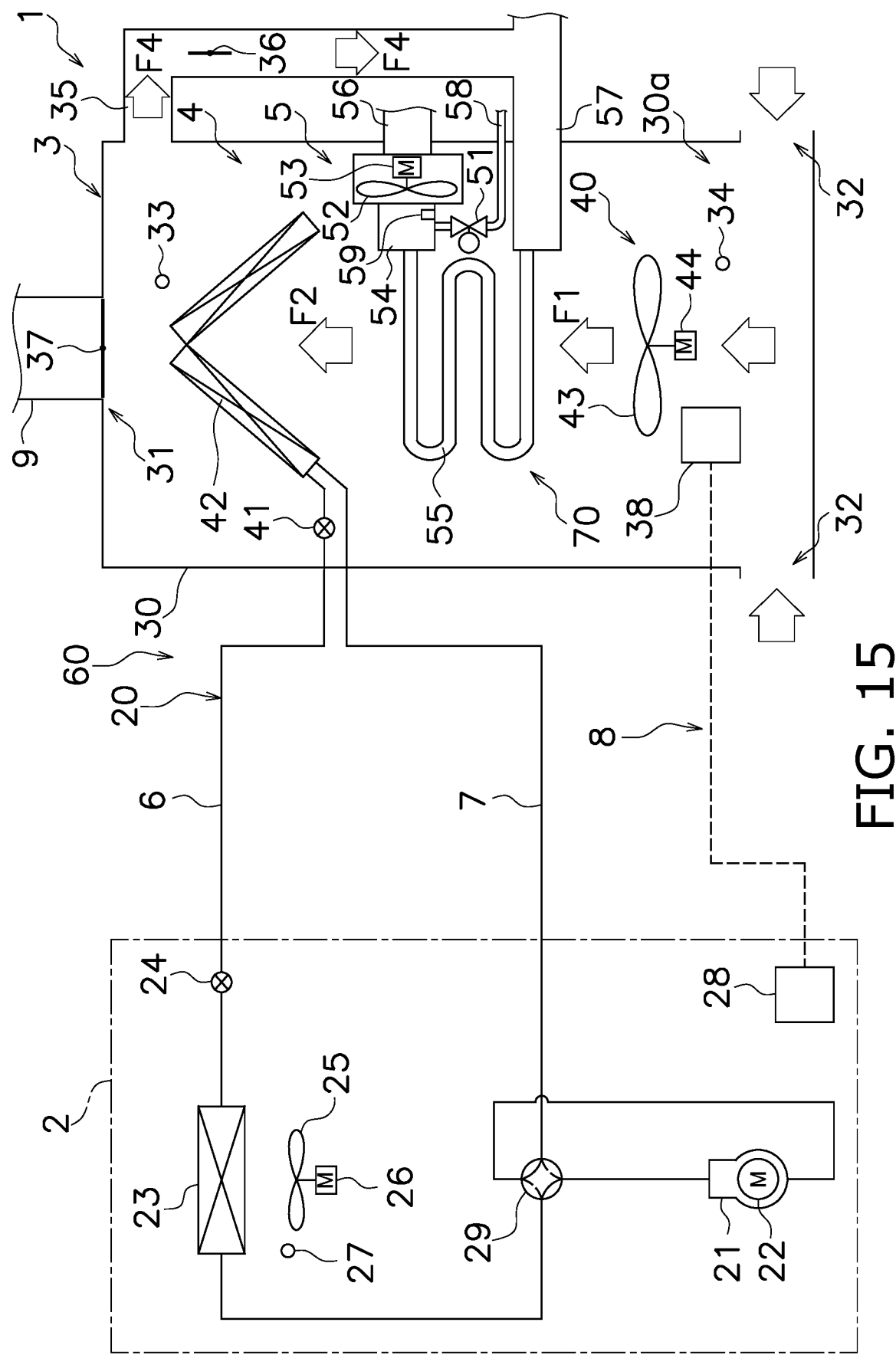
FIG. 15 is a schematic configuration diagram of an air conditioning system according to Modified example A of the second embodiment (added with an air flow due to the exhaust operation).
Figure 16:
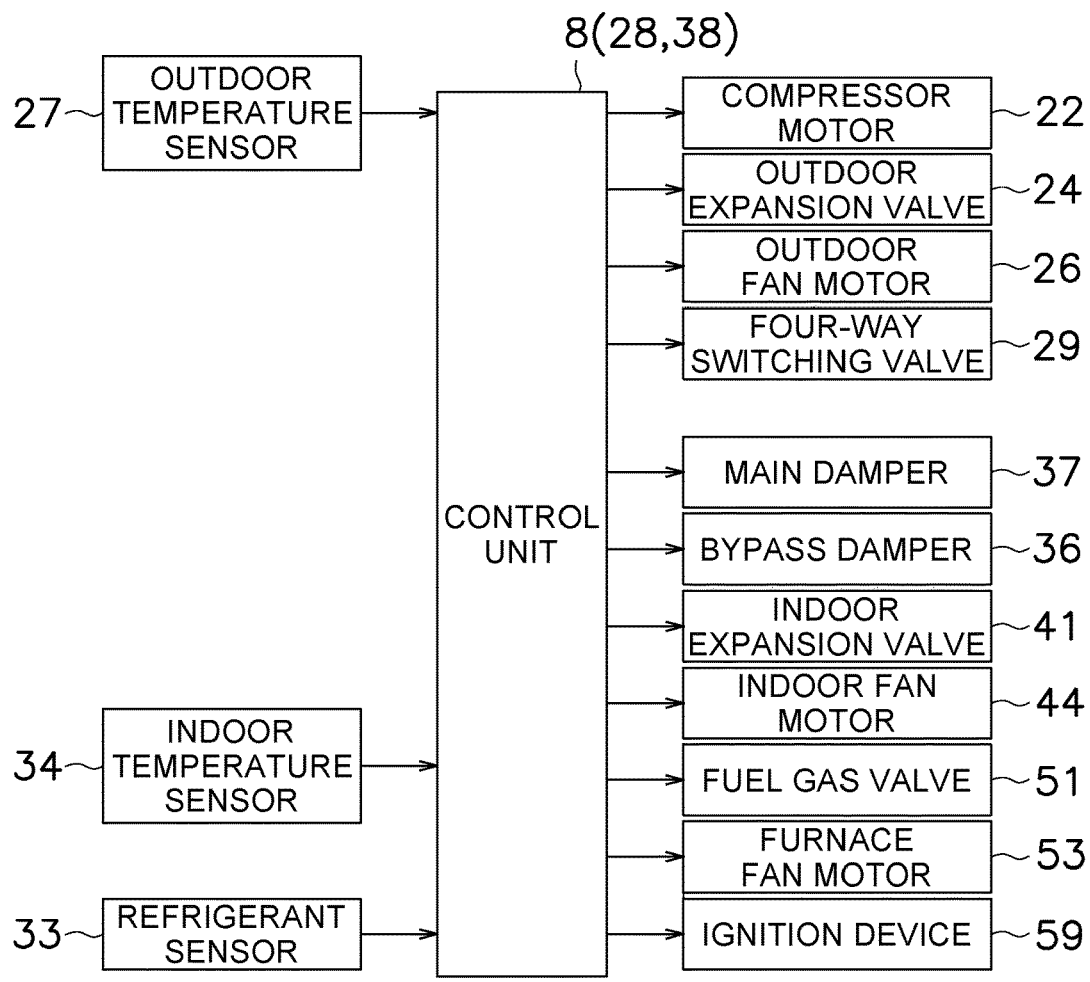
FIG. 16 is a control block diagram of the air conditioning system according to Modified example A of the second embodiment.

Therefore, here, as shown in FIGS. 15 and 16, in the air-blowing flow path 30a, a main damper 37 (a main opening and closing mechanism) that opens and closes the air-blowing flow path 30a is provided at a position downstream of a portion where the bypass pipe 35 is connected, with respect to a flow direction of the air in the air-blowing flow path 30a. Here, the main damper 37 is provided near the air outflow port 31 of the air-blowing flow path 30a. Here, FIGS. 15 and 16 are a schematic configuration diagram of the air conditioning system 1 according to Modified example A (added with an air flow due to the exhaust operation), and a control block diagram.

Figure 17:
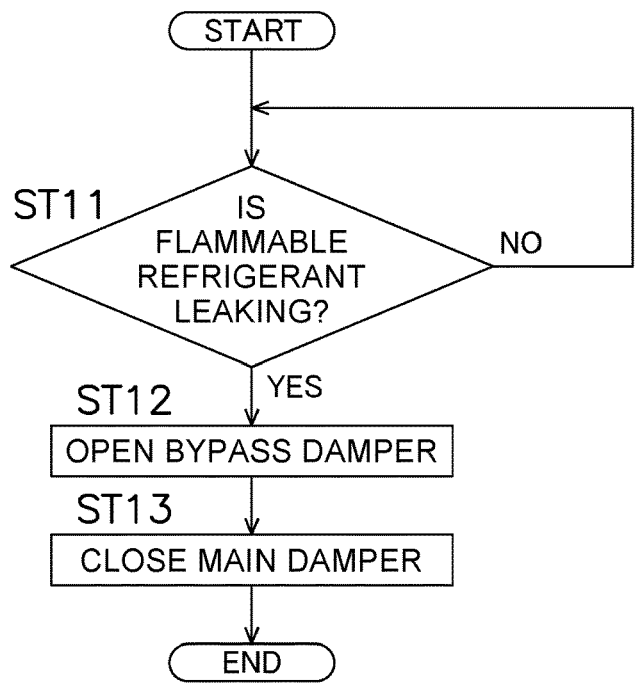
FIG. 17 is a flowchart showing the exhaust operation when a flammable refrigerant leaks in the air conditioning system according to Modified example A of the second embodiment.

Then, here, as shown in FIGS. 15 and 17, similarly to the second embodiment, the control unit 8 performs a process (steps ST11 and ST12) of bringing the bypass damper 36 into an open state when the flammable refrigerant leaks, and a process (step ST13) of bringing the main damper 37 into a closed state. That is, the control unit 8 brings the main damper 37 into the closed state (a close operation of the main damper) when bringing the bypass damper 36 into the open state. Here, FIG. 17 is a flowchart showing the exhaust operation when a flammable refrigerant leaks in the air conditioning system 1 according to Modified example A. Note that, as shown in FIG. 17, the main damper 37 may be closed after the bypass damper 36 is opened, or may be closed at the same time.

Closing the main damper 37 makes it possible, here, to cut off the communication between the air outflow port 31 of the air-blowing flow path 30a and inside of the room during the exhaust operation by the bypass pipe 35 and the bypass damper 36, and to eliminate an air flow from the air outflow port 31 of the air-blowing flow path 30a into the room to have only the air flow F4 to the bypass pipe 35, as shown in FIG. 15. This enables, here, reliable suppression of the leaked flammable refrigerant from being sent into the room during the exhaust operation by the bypass pipe 35 and the bypass damper 36.

—B—

In the second embodiment and Modified example A described above, in the utilization unit 3, the furnace heat exchanger 55 of the furnace unit 5 constituting the separate heat source unit 70 is arranged on a windward side of the indoor heat exchanger 42 of the indoor unit 4 constituting the heat pump unit 60 (on an upstream side of the indoor heat exchanger 42 with respect to a flow direction of air in the air-blowing flow path 30a). However, the arrangement of both the heat exchangers 42 and 55 is not limited to this.

Figure 18:
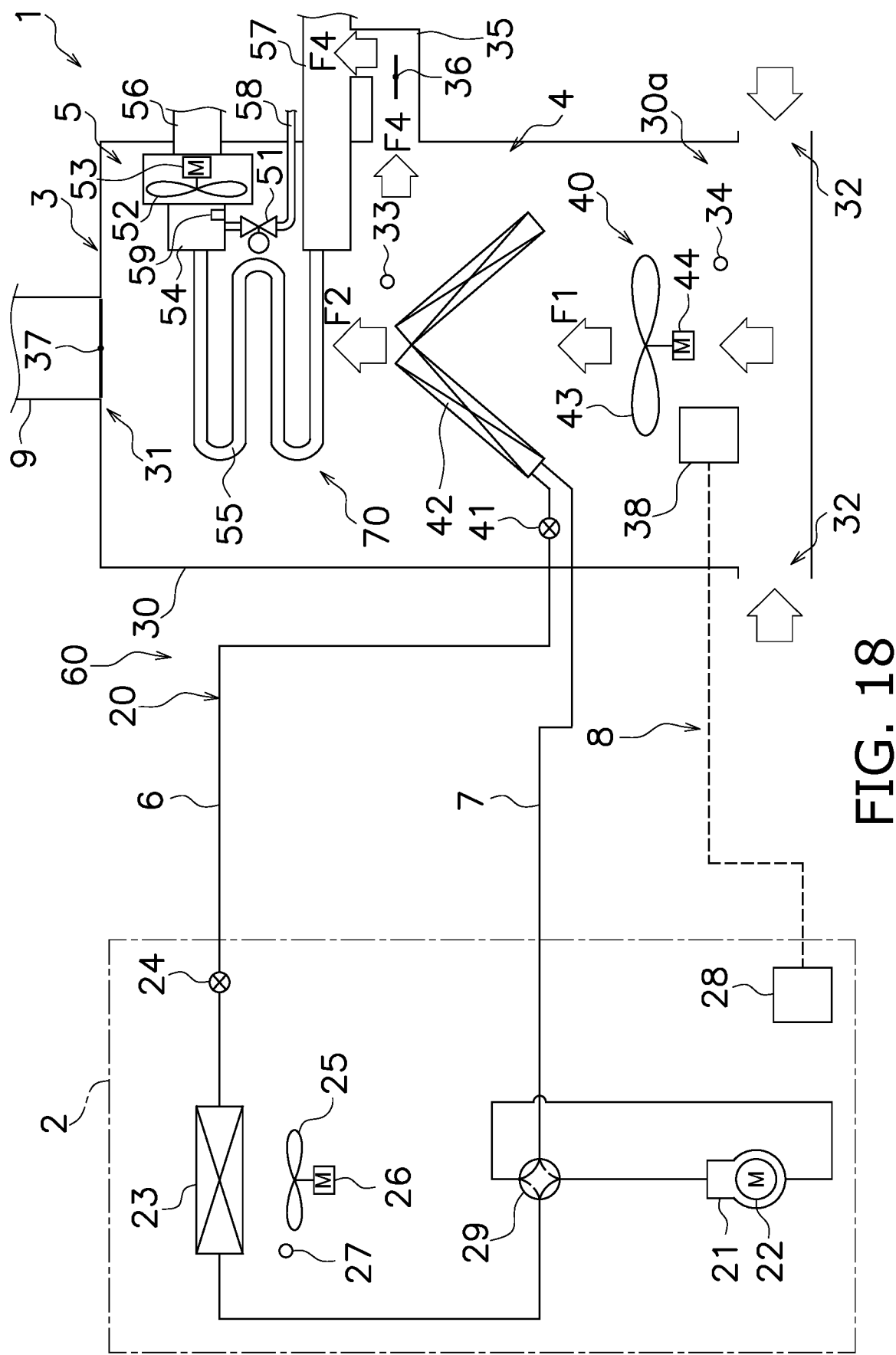
FIG. 18 is a schematic configuration diagram of an air conditioning system according to Modified example B of the second embodiment (added with an air flow due to the exhaust operation).

For example, as shown in FIG. 18, the furnace heat exchanger 55 of the furnace unit 5 as the separate heat source unit 70 may be arranged on a leeward side of the indoor heat exchanger 42 of the indoor unit 4 as the heat pump unit 60 (on a downstream side of the indoor heat exchanger 42 with respect to a flow direction of the air in the air-blowing flow path 30a). Here, the refrigerant sensor 33 is provided on a downstream side of the indoor heat exchanger 42 and on an upstream side of the furnace indoor heat exchanger 42 with respect to a flow direction of the air in the air-blowing flow path 30a.

Even in this case, as shown in FIG. 18, similarly to the second embodiment and Modified example A described above, by providing the bypass pipe 35 (the bypass flow path) and the bypass damper 36 (the bypass opening and closing mechanism), and also the main damper 37 (the main opening and closing mechanism), effects similar to those of the second embodiment and Modified example A can be obtained. Further, here, the refrigerant sensor 33 is provided on the upstream side of the furnace 5 with respect to a flow direction of the air in the air-blowing flow path 30a. Therefore, the leaked flammable refrigerant can be reliably detected in a portion, in the air-blowing flow path 30a, on a downstream side of the indoor heat exchanger 42 (the refrigerant heat exchanger) through which air containing the leaked flammable refrigerant passes, and portion on an upstream side of the furnace 5 that may become an ignition source.

—C—

The exhaust operation when the flammable refrigerant leaks in the second embodiment may be performed at the start operation of the separate heat source heating operation in the first embodiment.

For example, in the second embodiment and Modified examples A and B described above, the start operation of the separate heat source heating operation (the process of steps ST1 to ST4) in Modified example A of the first embodiment may be performed. In this case, if the flammable refrigerant leaks (steps ST4, ST11), the control unit 8 is to open the bypass damper 36 (step ST12), and closes the main damper 37 (step ST13).

This inhibits, here, the ignition operation of the furnace 5, and allows the leaked flammable refrigerant to be quickly exhausted from the air-blowing flow path 30a, if the flammable refrigerant leaks during the start operation of the separate heat source heating operation.

—D—

In the second embodiment and Modified examples A to C described above, the air-blowing flow path 30a is formed so that air flows upward from the air inflow port 32 toward the air outflow port 31, but the present invention is not limited to this. For example, although not illustrated here, the air-blowing flow path 30a may be formed so that air flows downward from the air inflow port 32 toward the air outflow port 31, and may be formed so that air flows horizontally. In this case, along the flow directions of the air, the indoor fan 40, the indoor heat exchanger 42 constituting the heat pump unit 60, the furnace heat exchanger 55 constituting the separate heat source unit 70 are provided.

—E—

In the second embodiment and Modified examples A to D described above, the room is heated by the refrigerant circuit 20 constituting the heat pump unit 60 (the heat pump heating operation). However, in addition to this operation, it is also possible to cool the room with the refrigerant circuit 20 constituting the heat pump unit 60 by switching the four-way switching valve 29 to a cooling state. That is, as the air conditioning in the room with the refrigerant circuit 20 constituting the heat pump unit 60, not only heating in the room but also cooling in the room may be performed. Further, the four-way switching valve 29 may be omitted from the refrigerant circuit 20, and only the indoor cooling may be performed as the air conditioning in the room.

—F—

In the second embodiment and Modified examples A to E described above, a refrigerant sensor may be further arranged near the indoor fan 40. For example, when a sirocco fan is used as the indoor fan 40, the refrigerant sensor may be arranged near a suction port. Arranging the refrigerant sensor at such a position enables quick detection of the presence or absence of leakage of the flammable refrigerant when the indoor fan 40 is rotated.

Although the embodiments of the present disclosure have been described above, it will be understood that various changes in forms and details can be made without departing from the gist and scope of the present disclosure as set forth in the claims.

INDUSTRIAL APPLICABILITY

The present disclosure is widely applicable to an air conditioning system having a heat pump unit that air-conditions a room with a vapor compression refrigerant circuit, and a separate heat source unit that air-conditions a room with a heat source separate from the heat pump unit.

REFERENCE SIGNS LIST

1: air conditioning system
5: furnace unit (furnace)
8: control unit
10: electric heater
20: refrigerant circuit
30a: air-blowing flow path
33: refrigerant sensor
35: bypass pipe (bypass flow path)
36: bypass damper (bypass opening and closing mechanism)
37: main damper (main opening and closing mechanism)
40: indoor fan
42: indoor heat exchanger (refrigerant heat exchanger)
57: exhaust pipe (exhaust flow path)
60: heat pump unit
70: separate heat source unit

CITATION LIST

Patent Literature

Patent Literature 1: JP S64-54160 A

The invention claimed is:

1. An air conditioning system comprising:
   an indoor fan that sends air into a room through an air-blowing flow path;
   a heat pump unit having a refrigerant circuit of vapor compression, wherein the refrigerant circuit has a refrigerant heat exchanger that exchanges heat between a refrigerant and the air, the refrigerant heat exchanger is arranged in the air-blowing flow path, and the heat pump unit air-conditions the room with the refrigerant circuit;
   a separate heat source unit having a furnace that is arranged in the air-blowing flow path and heats the air by burning fuel, or an electric heater that heats the air with heat generated by energization, wherein the separate heat source unit air-conditions the room with the furnace or the electric heater; and
   a controller is configured to control an operation of the indoor fan, the heat pump unit, and the separate heat source unit, wherein
   as the refrigerant, a flammable refrigerant is sealed in the refrigerant circuit, and
   the controller is configured to control air conditioning in the room with the separate heat source unit by
       starting operation of the indoor fan at a first time, before causing an operation for burning the fuel in the furnace or causing an operation for generating heat by energization in the electric heater, and
       initiating an operation for burning fuel in the furnace or initiating an operation for generating heat by energization in the electric heating at a second time occurring after the first time and while the indoor fan continues to operate without having stopped since the first time.

2. The air conditioning system according to claim 1, wherein
   the controller is configured to receive an input indicating whether or not a leak of flammable refrigerant has been detected and, when the input indicates that a refrigerant leak has not been detected, and while the indoor fan continues in operation in starting air conditioning in the room with the separate heat source unit, the controller is configured to cause the operation for burning the fuel in the furnace or the operation for generating heat by energization in the electric heater.

3. The air conditioning system according to claim 2, wherein
   when the input indicates that a refrigerant leak has been detected, and while the indoor fan continues in operation in starting air conditioning in the room with the separate heat source unit, the controller precludes the operation for burning the fuel in the furnace or the operation for generating heat by energization in the electric heater.

4. The air conditioning system according to claim 2, wherein
   a refrigerant sensor that detects the flammable refrigerant and provides the input to the controller is provided in the air-blowing flow path.

5. The air conditioning system according to claim 4, wherein
   the refrigerant sensor is provided on a downstream side of the refrigerant heat exchanger with respect to a flow direction of the air in the air-blowing flow path.

6. The air conditioning system according to claim 5, wherein
   the refrigerant sensor is provided on an upstream side of the furnace or the electric heater with respect to the flow direction of the air in the air-blowing flow path.

7. The air conditioning system according to claim 3, wherein
   a refrigerant sensor that detects the flammable refrigerant is provided in the air-blowing flow path.

* * * * *